United States Patent
Xiong et al.

(10) Patent No.: US 10,917,643 B2
(45) Date of Patent: Feb. 9, 2021

(54) METHOD AND APPARATUS FOR DETECTING SCENE CHANGE FRAME AND SYSTEM

(71) Applicant: Huawei Technologies Co., Ltd., Shenzhen (CN)

(72) Inventors: Jie Xiong, Nanjing (CN); Youqing Yang, Shenzhen (CN); Yihong Huang, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 60 days.

(21) Appl. No.: 16/284,664

(22) Filed: Feb. 25, 2019

(65) Prior Publication Data

US 2019/0260999 A1    Aug. 22, 2019

Related U.S. Application Data

(63) Continuation of application No. PCT/CN2017/098483, filed on Aug. 22, 2017.

(30) Foreign Application Priority Data

Aug. 23, 2016    (CN) .......................... 2016 1 0708531

(51) Int. Cl.
*H04N 19/114*    (2014.01)
*H04N 19/177*    (2014.01)
(Continued)

(52) U.S. Cl.
CPC ....... *H04N 19/142* (2014.11); *G06K 9/00744* (2013.01); *G06K 9/00765* (2013.01);
(Continued)

(58) Field of Classification Search
USPC .................................................... 375/240.12
See application file for complete search history.

(56) References Cited

U.S. PATENT DOCUMENTS

6,094,234 A    7/2000 Nonomura et al.
2006/0158529 A1    7/2006 Katagiri
(Continued)

FOREIGN PATENT DOCUMENTS

CN    1758759 A    4/2006
CN    101072342 A    11/2007
(Continued)

OTHER PUBLICATIONS

Machine Translation and Abstract of Chinese Publication No. CN1758759, Apr. 12, 2006, 7 pages.
(Continued)

*Primary Examiner* — Amir Shahnami
(74) *Attorney, Agent, or Firm* — Conley Rose, P.C.

(57) ABSTRACT

A method and an apparatus for detecting a scene change frame in a video and a system, where when a scene change frame in the video is detected, whether a maximum P frame ($P_{max}$) in all P frames in a group of pictures (GOP) of the video is a scene change frame is determined based on a relative relationship between a size $P_k^{max}$ of $P_{max}$ and a median or an average of sizes of a plurality of I frames between $P_{max}$ and a scene change frame closest to $P_{max}$ and before $P_{max}$, or a relative relationship between $P_k^{max}$ and a median or an average of sizes of a plurality of P frames in the GOP to detect a scene change frame in the P frames such that missed detection of a scene change frame is effectively reduced.

20 Claims, 13 Drawing Sheets

(51) Int. Cl.
*H04N 19/142* (2014.01)
*G06K 9/00* (2006.01)
*H04N 19/48* (2014.01)
*H04N 19/146* (2014.01)
*H04N 19/159* (2014.01)
*G06T 7/20* (2017.01)
*H04N 19/87* (2014.01)

(52) U.S. Cl.
CPC ............ *G06T 7/20* (2013.01); *H04N 19/114* (2014.11); *H04N 19/146* (2014.11); *H04N 19/159* (2014.11); *H04N 19/177* (2014.11); *H04N 19/48* (2014.11); *H04N 19/87* (2014.11)

(56) References Cited

U.S. PATENT DOCUMENTS

| | | | |
|---|---|---|---|
| 2006/0245492 | A1 | 11/2006 | Pun et al. |
| 2011/0002381 | A1* | 1/2011 | Yang ............ H04N 19/40 375/240.03 |
| 2013/0314553 | A1 | 11/2013 | Sun et al. |
| 2016/0198166 | A1* | 7/2016 | Kudana ............ H04N 19/114 375/240.15 |

FOREIGN PATENT DOCUMENTS

| | | | |
|---|---|---|---|
| CN | 102630013 | A | 8/2012 |
| CN | 102740108 | A | 10/2012 |
| CN | 103826121 | A | 5/2014 |
| CN | 103945281 | A | 7/2014 |
| EP | 0810793 | A2 | 12/1997 |
| EP | 0587397 | B1 | 5/2000 |
| JP | H09322174 | A | 12/1997 |
| JP | 2002010254 | A | 1/2002 |
| JP | 2010219929 | A | 9/2010 |
| WO | 2016027410 | A1 | 2/2016 |

OTHER PUBLICATIONS

Machine Translation and Abstract of Chinese Publication No. CN101072342, Nov. 14, 2007, 12 pages.
Machine Translation and Abstract of Chinese Publication No. CN102630013, Aug. 8, 2012, 14 pages.
Machine Translation and Abstract of Chinese Publication No. CN103826121, May 28, 2014, 28 pages.
Machine Translation and Abstract of Chinese Publication No. CN103945281, Jul. 23, 2014, 16 pages.
Machine Translation and Abstract of International Publication No. WO2016027410, Feb. 25, 2016, 27 pages.
"Series P: Terminals and Subjective and Objective Assessment Methods, Models and tools for quality assessment of streamed media, Parametric non-intrusive assessment of audiovisual media streaming quality—Higher resolution application area," ITU-T P.1201.2, Oct. 2012, 56 pages.
"Series P: Terminals and Subjective and Objective Assessment Methods, Models and tools for quality assessment of streamed media, Parametric non-intrusive bitstream assessment of video media streaming quality— Higher resolution application area," ITU-T P.1202.2, May 2013, 64 pages.
"Series H: Audiovisual and Multimedia Systems, Infrastructure of audiovisual services—Coding of moving video, Advanced video coding for generic audiovisual services," ITU-T H.264, Feb. 2016, 807 pages.
"Series H: Audiovisual and Multimedia Systems, Infrastructure of audiovisual services—Coding of moving video, High efficiency video coding," ITU-T H.265, Apr. 2015, 634 pages.
Foreign Communication From a Counterpart Application, PCT Application No. PCT/CN2017/098483, English Translation of International Search Report dated Oct. 27, 2017, 3 pages.
Foreign Communication From a Counterpart Application, PCT Application No. PCT/CN2017/098483, English Translation of Written Opinion dated Oct. 27, 2017, 4 pages.
Yoo, S., "Efficient Traffic Prediction Scheme for Real-Time VBR MPEG Video Transmission Over High-Speed Networks," XP055579892, IEEE Transactions on Broadcasting, vol. 48, No. 1, Mar. 1, 2002, 10 pages.
Foreign Communication From a Counterpart Application, European Application No. 17842903.1, Extended European Search Report dated May 9, 2019, 6 pages.
Nam, C., et al., "Effective algorithm of scene change detection in H.264/AVC video," 2011, 4 pages.

* cited by examiner

METHOD AND APPARATUS FOR DETECTING SCENE CHANGE FRAME AND SYSTEM

CROSS-REFERENCE TO RELATED APPLICATIONS

This application is a continuation of International Patent Application No. PCT/CN2017/098483 filed on Aug. 22, 2017, which claims priority to Chinese Patent Application No. 201610708531.5 filed on Aug. 23, 2016. The disclosures of the aforementioned applications are hereby incorporated by reference in their entireties.

TECHNICAL FIELD

The present disclosure relates to the field of video technologies, and in particular, to a method and an apparatus for detecting a scene change frame and a system.

BACKGROUND

With development of communications technologies, video services such as an Internet Protocol Television (IPTV) service and an over-the-top (OTT) service are widely put into commercial use. To ensure quality of the video services, video quality needs to be evaluated such that adjustment is performed in a timely manner using corresponding measures, and normal running of the video services is ensured. Therefore, how to accurately evaluate the video quality is an important problem that needs to be resolved urgently.

A segment of video includes a plurality of consecutive video frame sequences, and generally includes more than one scene. For example, a segment of video includes four scenes, a scene 1 and a scene 3 correspond to shot videos of a football pitch, and a scene 2 and a scene 4 correspond to shot videos of an auditorium.

When the video quality is being evaluated, a location at which a scene changes needs to be first detected, namely, a location of a scene change frame, and then the video quality is evaluated based on the scene. For example, because a video coding loss caused during video coding is related to not only a video coding type, a frame rate, a resolution, and a bit rate, but also complexity of the scene, the location at which the scene changes needs to be first detected to evaluate the video coding loss. Therefore, when the video quality is being evaluated, scene change detection needs to be accurately performed.

When video frames in the video are being coded, the video frames are coded into different types of frames, for example, an I frame, a P frame, and a B frame. The I frame is an intra-frame predictive frame, and only data in the frame is referenced during coding. The P frame is a predictive frame, that is, a unidirectional difference frame, and is used to record a difference between the frame and a previous I frame (or P frame). The B frame is a bi-directional interpolated predictive frame, that is, a bi-directional difference frame, and is used to record a difference between the frame and each of a previous frame and a next frame.

A method for detecting a scene change frame is provided in an IPTV monitoring solution in the standard International Telecommunication Union (ITU) Telecommunication Standardization Sector (ITU-T) P1201.2. However, only a scene change frame in I frames is detected in other approaches, but actually many scene change frames are P frames. Consequently, missed detection occurs during scene change frame detection in the other approaches.

SUMMARY

Embodiments of the present disclosure provide a method and an apparatus for detecting a scene change frame, so as to avoid missed detection of a scene change frame in the other approaches.

According to a first aspect, a method for detecting a scene change frame is provided. A video includes N groups of pictures (GOPs), N is an integer greater than or equal to 2, and the method includes determining a maximum P frame $P_{max}$ in all P frames in a $K^{th}$ GOP, where a size of $P_{max}$ is $P_k^{max}$, K is a variable ranging from M to N, and $1 \leq M \leq N$, and when a relative value between $P_k^{max}$ and $S_{SC}^I$ is greater than or equal to a first threshold, and a relative value between $P_k^{max}$ and $S_{SC}^P$ is greater than or equal to a second threshold, determining that $P_{max}$ is a scene change frame, where $S_{SC}^I$ is a median or an average of sizes of a plurality of I frames between $P_{max}$ and a scene change frame that is closest to $P_{max}$ and that is before $P_{max}$, $S_{SC}^P$ is a median or an average of sizes of a plurality of P frames in the $K^{th}$ GOP, the first threshold is greater than 0 and less than 1, and the second threshold is greater than 1.

In the method provided in the first aspect of the present disclosure, when a scene change frame in the video is detected, a scene change frame in the P frames may be detected such that missed detection of a scene change frame is effectively reduced.

In a first possible implementation of the first aspect, the relative value $R_k^I$ between $P_k^{max}$ and $S_{SC}^I$ may be calculated according to a formula $$R_k^I = \frac{P_k^{max}}{s_{sc}^I} \text{ or } R_k^I = \frac{|P_k^{max} - s_{sc}^I|}{s_{sc}^I}.$$

A relative relationship between $P_k^{max}$ and $S_{SC}^I$ may be simply and effectively reflected in the formula $$R_k^I = \frac{P_k^{max}}{s_{sc}^I} \text{ or } R_k^I = \frac{|P_k^{max} - s_{sc}^I|}{s_{sc}^I}.$$

In an implementation, $R_k^I$ is calculated according to the formula $$R_k^I = \frac{P_k^{max}}{s_{sc}^I},$$

correspondingly, the first threshold may be calculated according to a formula $$I_{threshold} = \frac{P_{median}}{I_{median}}.$$

In another implementation, $R_k^I$ is calculated according to the formula $$R_k^I = \frac{|P_k^{max} - s_{sc}^I|}{s_{sc}^I},$$

and correspondingly, the first threshold may be calculated according to a formula $$I_{threshold} = \frac{|P_{median} - I_{median}|}{I_{median}}.$$

$I_{threshold}$ is the first threshold, $I_{median}$ is a median or an average of sizes of all I frames in the video, and $P_{median}$ is a median or an average of sizes of all P frames in the video.

Because $I_{median}$ is the median or the average of the sizes of all the I frames in the video, and $P_{median}$ is the median or the average of the sizes of all the P frames in the video, a valid threshold may be accurately calculated using the formula $$I_{threshold} = \frac{P_{median}}{I_{median}} \text{ or } I_{threshold} = \frac{|P_{median} - I_{median}|}{I_{median}}$$

such that a scene change frame in the P frames is accurately detected.

With reference to the first aspect or the first possible implementation of the first aspect, in a second possible implementation, the relative value $R_k^P$ between $P_k^{max}$ and $S_{SC}^P$ may be calculated according to a formula $$R_k^P = \frac{P_k^{max}}{S_{SC}^P}.$$

A relative relationship between $P_k^{max}$ and $S_{SC}^P$ may be simply and effectively reflected in the formula $$R_k^P = \frac{P_k^{max}}{S_{SC}^P}.$$

$S_{SC}^P$ may be calculated according to the following formula $S_{SC}^P = F(P_{-m}, \ldots, P^{-1}, P_1, \ldots, P_n)$, where $P_{-m}, \ldots,$ and $P_{-1}$ represent P frames before $P_{max}$ in the $K^{th}$ GOP, $P_1, \ldots,$ and $P_n$ represent P frames after $P_{max}$ in the $K^{th}$ GOP, and F is used to calculate a median or an average of sizes of $P_{-m}, \ldots,$ and $P_{-1}$, and $P_1, \ldots,$ and $P_n$, and m=min(num_before_P_frames, max_num), and n=min(num_after_P_frames, max_num), where num_before_P_frames is a quantity of P frames before $P_{max}$ in the $K^{th}$ GOP, num_after_P_frames is a quantity of P frames after $P_{max}$ in the $K^{th}$ GOP, and max_num represents a preset quantity of frames that need to be considered.

$S_{SC}^P$ is calculated using the formula, and some video frames that are closest to $P_{max}$ and that are in a GOP in which $P_{max}$ is located are considered such that accuracy of detecting a scene change frame in the P frames is further improved.

According to a second aspect, a method for implementing video quality evaluation is provided. The video includes N GOPs, N is an integer greater than or equal to 2, and the method includes determining a maximum P frame $P_{max}$ in all P frames in a $K^{th}$ GOP, where a size of $P_{max}$ is $P_k^{max}$, K is a variable ranging from M to N, and 1≤M≤N, and when a relative value between $P_k^{max}$ and $S_{SC}^I$ is greater than or equal to a first threshold, a relative value between $P_k^{max}$ and $S_{SC}^P$ is greater than or equal to a second threshold, and there is no B frame in the $K^{th}$ GOP, or when a relative value between $P_k^{max}$ and $S_{SC}^I$ is greater than or equal to a first threshold, a relative value between $P_k^{max}$ and $S_{SC}^I$ is greater than or equal to a second threshold, there is a B frame in the $K^{th}$ GOP, and a relative value between $P_k^{max}$ and $S_{SC}^B$ is greater than or equal to a third threshold, determining that $P_{max}$ is a scene change frame, where $S_{SC}^I$ is a median or an average of sizes of a plurality of I frames between $P_{xax}$ and a scene change frame that is closest to $P_{max}$ and that is before $P_{max}$, $S_{SC}^P$ is a median or an average of sizes of a plurality of P frames in the $K^{th}$ GOP, $S_{SC}^B$ is a median or an average of sizes of all B frames between $P_{max}$ and the scene change frame that is closest to $P_{max}$ and that is before $P_{max}$, the first threshold is greater than 0 and less than 1, the second threshold is greater than 1, and the third threshold is greater than 1.

In the method provided in the second aspect of the present disclosure, when a scene change frame in the video is detected, a scene change frame in the P frames may be detected such that missed detection of a scene change frame is effectively reduced. In addition, when a scene change frame in the P frames is being detected, not only sizes of an I frame and a P frame but also a size of a B frame is considered such that accuracy of detecting a scene change frame in the P frames is further improved.

In a first possible implementation of the second aspect, the relative value $R_k^I$ between $P_k^{max}$ and $S_{SC}^I$ may be calculated according to a formula $$R_k^I = \frac{P_k^{max}}{s_{sc}^I} \text{ or } R_k^I = \frac{|P_k^{max} - s_{sc}^I|}{s_{sc}^I}.$$

A relative relationship between $P_k^{max}$ and $S_{SC}^I$ may be simply and effectively reflected in the formula $$R_k^I = \frac{P_k^{max}}{s_{sc}^I} \text{ or } R_k^I = \frac{|P_k^{max} - s_{sc}^I|}{s_{sc}^I}.$$

In an implementation, $R_k^I$ may be calculated according to the formula $$R_k^I = \frac{P_k^{max}}{s_{sc}^I},$$

and correspondingly, the first threshold may be calculated according to a formula $$I_{threshold} = \frac{P_{median}}{I_{median}}.$$

In another implementation, $R_k^I$ may be calculated according to the formula $$R_k^I = \frac{|P_k^{max} - s_{sc}^I|}{s_{sc}^I},$$

and correspondingly, the first threshold may be calculated according to a formula $$I_{threshold} = \frac{|P_{median} - I_{median}|}{I_{median}}.$$

$I_{threshold}$ is the first threshold, $I_{median}$ is a median or an average of sizes of all I frames in the video, and $P_{median}$ is a median or an average of sizes of all P frames in the video.

Because $I_{median}$ is the median or the average of the sizes of all the I frames in the video, and $P_{median}$ is the median or the average of the sizes of all the P frames in the video, a valid threshold may be accurately calculated using the formula $$I_{threshold} = \frac{P_{median}}{I_{median}} \text{ or } I_{threshold} = \frac{|P_{median} - I_{median}|}{I_{median}}$$

such that a scene change frame in the P frames is accurately detected.

With reference to the second aspect or the first possible implementation of the second aspect, in a second possible implementation, the relative value $R_k^P$ between $P_k^{max}$ and $S_{SC}^P$ may be calculated according to a formula $$R_k^p = \frac{P_k^{max}}{S_{SC}^p}.$$

A relative relationship between $P_k^{max}$ and $S_{SC}^P$ may be simply and effectively reflected in the formula $$R_k^p = \frac{P_k^{max}}{S_{SC}^p}.$$

$S_{SC}^P$ may be further calculated according to the following formula $S_{SC}^P = F(P_{-m}, \ldots, P_{-1}, P_1, \ldots, P_n)$, where $P_{-m}, \ldots$, and $P_{-1}$ represent P frames before $P_{max}$ in the $K^{th}$ GOP, $P_1, \ldots$, and $P_n$ epresent P frames after $P_{max}$ in the $K^{th}$ GOP, and F is used to calculate a median or an average of sizes of $P_{-m}, \ldots$, and $P_{-1}$, and $P_1, \ldots$, and $P_n$, and m=min(num_before_P_frames, max_num), and n=min(num_after_P_frames, max_num), where num_before_P_frames is a quantity of P frames before $P_{max}$ in the $K^{th}$ GOP, num_after_P_frames is a quantity of P frames after $P_{max}$ in the $K^{th}$ GOP, and max_num represents a preset quantity of frames that need to be considered.

$S_{SC}^P$ is calculated using the formula, and some video frames that are closest to $P_{max}$ and that are in a GOP in which $P_{max}$ is located are considered such that accuracy of detecting a scene change frame in the P frames is further improved.

With reference to the second aspect, or the first or the second possible implementation of the second aspect, in a third possible implementation, the relative value $R_k^B$ between $P_k^{max}$ and $S_{SC}^B$ may be further calculated according to a formula $$R_k^B = \frac{P_k^{max}}{S_{SC}^B} \text{ or } R_k^B = \frac{|P_k^{max} - S_{SC}^B|}{S_{SC}^B}.$$

A relative relationship between $P_k^{max}$ and $S_{SC}^B$ may be simply and effectively reflected in the formula $$R_k^B = \frac{P_k^{max}}{S_{SC}^B} \text{ or } R_k^B = \frac{|P_k^{max} - S_{SC}^B|}{S_{SC}^B}.$$

In an implementation, $R_k^B$ is calculated according to the formula $$R_k^B = \frac{P_k^{max}}{S_{SC}^B},$$

and correspondingly, the third threshold may be calculated according to a formula $$B_{threshold} = \frac{P_{median}}{B_{median}}.$$

In another implementation, $R_k^B$ is calculated according to the formula $$R_k^B = \frac{|P_k^{max} - S_{SC}^B|}{S_{SC}^B},$$

and correspondingly, the third threshold may be calculated according to a formula $$B_{threshold} = \frac{|P_{median} - B_{median}|}{B_{median}}.$$

$B_{threshold}$ is the third threshold, $P_{median}$ is the median or the average of the sizes of all the P frames in the video, and $B_{median}$ is a median or an average of sizes of all B frames in the video.

Because $P_{median}$ is the median or the average of the sizes of all the P frames in the video, and $B_{median}$ is the median or the average of the sizes of all the B frames in the video, a valid threshold may be accurately calculated using the formula $$B_{threshold} = \frac{P_{median}}{B_{median}} \text{ or } B_{threshold} = \frac{|P_{median} - B_{median}|}{B_{median}}$$

such that a scene change frame in the P frames is accurately detected.

With reference to the third possible implementation of the second aspect, in a fourth possible implementation, after $P_{max}$ in the $K^{th}$ GOP is determined as a scene change frame, a median or an average of sizes of P frames other than a P frame that is determined as a scene change frame in the video is used as a new $P_{median}$, and a new $B_{threshold}$ is calculated according to the formula $$B_{threshold} = \frac{P_{median}}{B_{median}} \text{ or } B_{threshold} = \frac{|P_{median} - B_{median}|}{B_{median}}.$$

The new $B_{threshold}$ is used for determining whether $P_{max}$ in a next GOP is a scene change frame.

With reference to the fourth possible implementation of the second aspect, the third threshold $B_{threshold}$ may be updated in real time such that impact of a P frame that is determined as a scene change frame is eliminated in a timely manner, thereby further improving accuracy of detecting a scene change frame in the P frames.

According to a third aspect, a detection apparatus for detecting a scene change frame in a video is provided. The video includes N GOPs, N is an integer greater than or equal to 2, and the detection apparatus includes a first determining unit and a second determining unit.

The first determining unit is configured to determine a maximum P frame $P_{max}$ in all P frames in a $K^{th}$ GOP, where a size of $P_{max}$ is $P_k^{max}$, K is a variable ranging from M to N, and 1≤M≤N, and the second determining unit is configured to when a relative value between $P_k^{max}$ and $S_{SC}^I$ is greater than or equal to a first threshold, and a relative value between $P_k^{max}$ and $S_{SC}^P$ is greater than or equal to a second threshold, determine that $P_{max}$ is a scene change frame, where $S_{SC}^I$ is a median or an average of sizes of a plurality of I frames between $P_{max}$ and a scene change frame that is closest to $P_{max}$ and that is before $P_{max}$, $S_{SC}^P$ is a median or an average of sizes of a plurality of P frames in the $K^{th}$ GOP, the first threshold is greater than 0 and less than 1, and the second threshold is greater than 1.

In the detection apparatus provided in the third aspect of the present disclosure, when a scene change frame in the video is detected, a scene change frame in the P frames may be detected such that missed detection of a scene change frame is effectively reduced.

In a first possible implementation of the third aspect, the second determining unit may calculate the relative value $R_k^I$ between $P_k^{max}$ and $S_{SC}^I$ according to a formula $$R_k^I = \frac{P_k^{max}}{S_{sc}^I} \text{ or } R_k^I = \frac{|P_k^{max} - S_{sc}^I|}{S_{sc}^I}.$$

A relative relationship between $P_k^{max}$ and $S_{SC}^I$ may be simply and effectively reflected in the formula $$R_k^I = \frac{P_k^{max}}{S_{sc}^I} \text{ or } R_k^I = \frac{|P_k^{max} - S_{sc}^I|}{S_{sc}^I}.$$

In an implementation, the second determining unit calculates $R_k^I$ according to the formula $$R_k^I = \frac{P_k^{max}}{S_{sc}^I},$$

and correspondingly, the second determining unit may calculate the first threshold according to a formula $$I_{threshold} = \frac{P_{median}}{I_{median}}.$$

In another implementation, the second determining unit calculates $R_k^I$ according to the formula $$R_k^I = \frac{|P_k^{max} - S_{sc}^I|}{S_{sc}^I},$$

and correspondingly, the second determining unit may calculate the first threshold according to a formula $$I_{threshold} = \frac{|P_{median} - I_{median}|}{I_{median}}.$$

$I_{threshold}$ is the first threshold, $I_{median}$ is a median or an average of sizes of all I frames in the video, and $P_{median}$ is a median or an average of sizes of all P frames in the video.

Because $I_{median}$ is the median or the average of the sizes of all the I frames in the video, and $P_{median}$ is the median or the average of the sizes of all the P frames in the video, a valid threshold may be accurately calculated using the formula $$I_{threshold} = \frac{P_{median}}{I_{median}} \text{ or } I_{threshold} = \frac{|P_{median} - I_{median}|}{I_{median}}$$

such that a scene change frame in the P frames is accurately detected.

With reference to the third aspect or the first possible implementation of the third aspect, in a second possible implementation, the second determining unit may calculate the relative value $R_k^P$ between $P_k^{max}$ and $S_{SC}^P$ according to a formula $$R_k^P = \frac{P_k^{max}}{S_{SC}^P}.$$

A relative relationship between $P_k^{max}$ and $S_{SC}^P$ may be simply and effectively reflected in the formula $$R_k^P = \frac{P_k^{max}}{S_{SC}^P}.$$

The second determining unit may calculate $S_{SC}^P$ according to the following formula $S_{SC}^P = F(P_{-m}, \ldots, P_{-1}, P_1, \ldots, P_n)$, where $P_{-m}, \ldots,$ and $P_{-1}$ represent P frames before $P_{max}$ in the $K^{th}$ GOP, $P_1, \ldots,$ and $P_n$ represent P frames after $P_{max}$ in the $K^{th}$ GOP, and F is used to calculate a median or an average of sizes of $P_{-m}, \ldots,$ and $P_{-1}$, and $P_1, \ldots,$ and $P_n$, and m=min(num_before_P_frames, max_num), and n=min(num_after_P_frames, max_num), where num_before_P_frames is a quantity of P frames before $P_{max}$ in the $K^{th}$ GOP, num_after_P_frames is a quantity of P frames after $P_{max}$ in the $K^{th}$ GOP, and max_num represents a preset quantity of frames that need to be considered.

$S_{SC}^P$ is calculated using the formula, and some video frames that are closest to $P_{max}$ and that are in a GOP in which $P_{max}$ is located are considered such that accuracy of detecting a scene change frame in the P frames is further improved.

According to a fourth aspect, a detection apparatus for detecting a scene change frame in a video is provided. The video includes N GOPs, N is an integer greater than or equal to 2, and the detection apparatus includes a first determining unit and a second determining unit.

The first determining unit is configured to determine a maximum P frame $P_{max}$ in all P frames in a $K^{th}$ GOP, where a size of $P_{max}$ is $P_k^{max}$, K is a variable ranging from M to N, and 1≤M≤N, and the second determining unit is configured to when a relative value between $P_k^{max}$ and $S_{SC}^I$ is greater than or equal to a first threshold, a relative value between $P_k^{max}$ and $S_{SC}^P$ is greater than or equal to a second threshold, and there is no B frame in the $K^{th}$ GOP, or when a relative value between $P_k^{max}$ and $S_{SC}^I$ is greater than or equal to a first threshold, a relative value between $P_k^{max}$ and $S_{SC}^P$ is greater than or equal to a second threshold, there is a B frame in the $K^{th}$ GOP, and a relative value between $P_k^{max}$ and $S_{SC}^B$ is greater than or equal to a third threshold, determine that $P_{max}$ is a scene change frame, where $S_{SC}^I$ is a median or an average of sizes of a plurality of I frames between $P_{max}$ and a scene change frame that is closest to $P_{max}$ and that is before $P_{max}$, $S_{SC}^P$ is a median or an average of sizes of a plurality of P frames in the $K^{th}$ GOP, $S_{SC}^B$ is a median or an average of sizes of all B frames between $P_{max}$ and the scene change frame that is closest to $P_{max}$ and that is before $P_{max}$, the first threshold is greater than 0 and less than 1, the second threshold is greater than 1, and the third threshold is greater than 1.

In the detection apparatus provided in the fourth aspect of the present disclosure, when a scene change frame in the video is detected, a scene change frame in the P frames may be detected such that missed detection of a scene change frame is effectively reduced. In addition, when a scene change frame in the P frames is being detected, not only sizes of an I frame and a P frame but also a size of a B frame is considered such that accuracy of detecting a scene change frame in the P frames is further improved.

In a first possible implementation of the fourth aspect, the second determining unit may calculate the relative value $R_k^I$ between $P_k^{max}$ and $S_{SC}^I$ according to a formula $$R_k^I = \frac{P_k^{max}}{s_{sc}^I} \text{ or } R_k^I = \frac{|P_k^{max} - s_{sc}^I|}{s_{sc}^I}.$$

A relative relationship between $P_k^{max}$ and $S_{SC}^I$ may be simply and effectively reflected in the formula $$R_k^I = \frac{P_k^{max}}{s_{sc}^I} \text{ or } R_k^I = \frac{|P_k^{max} - s_{sc}^I|}{s_{sc}^I}.$$

In an implementation, the second determining unit calculates $R_k^I$ according to the formula $$R_k^I = \frac{P_k^{max}}{s_{sc}^I},$$

and correspondingly, the second determining unit may calculate the first threshold according to a formula $$I_{threshold} = \frac{P_{median}}{I_{median}}.$$

In another implementation, the second determining unit calculates $R_k^I$ according to the formula $$R_k^I = \frac{|P_k^{max} - s_{sc}^I|}{s_{sc}^I},$$

and correspondingly, the second determining unit may calculate the first threshold according to a formula $$I_{threshold} = \frac{|P_{median} - I_{median}|}{I_{median}}.$$

$I_{threshold}$ is the first threshold, $I_{median}$ is a median or an average of sizes of all I frames in the video, and $P_{median}$ is a median or an average of sizes of all P frames in the video.

Because $I_{median}$ is the median or the average of the sizes of all the I frames in the video, and $P_{median}$ is the median or the average of the sizes of all the P frames in the video, a valid threshold may be accurately calculated using the formula $$I_{threshold} = \frac{P_{median}}{I_{median}} \text{ or } I_{threshold} = \frac{|P_{median} - I_{median}|}{I_{median}}$$

such that a scene change frame in the P frames is accurately detected.

With reference to the fourth aspect or the first possible implementation of the fourth aspect, in a second possible implementation, the second determining unit may calculate the relative value $R_k^P$ between $P_k^{max}$ and $S_{SC}^P$ according to a formula $$R_k^P = \frac{P_k^{max}}{S_{SC}^P}.$$

A relative relationship between $P_k^{max}$ and $S_{SC}^P$ may be simply and effectively reflected in the formula $$R_k^P = \frac{P_k^{max}}{S_{SC}^P}.$$

The second determining unit may calculate $S_{SC}^P$ according to the following formula $S_{SC}^P = F(P_{-m}, \ldots, P_{-1}, P_1, \ldots, P_n)$,
where $P_{-m}, \ldots,$ and $P_{-1}$ represent P frames before $P_{max}$ in the $K^{th}$ GOP, $P_1, \ldots,$ and $P_n$ represent P frames after $P_{max}$ in the $K^{th}$ GOP, and F is used to calculate a median or an average of sizes of $P_{-m}, \ldots,$ and $P_{-1}$, and $P_1, \ldots,$ and $P_n$, and m=min(num_before_P_frames, max_num), and n=min (num_after_P_frames, max_num), where num_before_P_frames is a quantity of P frames before $P_{max}$ in the $K^{th}$ GOP, num_after_P_frames is a quantity of P frames after $P_{max}$ in the $K^{th}$ GOP, and max_num represents a preset quantity of frames that need to be considered.

$S_{SC}^P$ is calculated using the formula, and some video frames that are closest to $P_{max}$ and that are in a GOP in which $P_{max}$ is located are considered such that accuracy of detecting a scene change frame in the P frames is further improved.

With reference to the fourth aspect, or the first or the second possible implementation of the fourth aspect, in a third possible implementation, the second determining unit may calculate the relative value $R_k^B$ between $P_k^{max}$ and $S_{SC}^B$ according to a formula $$R_k^B = \frac{P_k^{max}}{S_{SC}^B} \text{ or } R_k^B = \frac{|P_k^{max} - S_{SC}^B|}{S_{SC}^B}.$$

A relative relationship between $P_k^{max}$ and $S_{SC}^B$ may be simply and effectively reflected in the formula $$R_k^B = \frac{P_k^{max}}{S_{SC}^B} \text{ or } R_k^B = \frac{|P_k^{max} - S_{SC}^B|}{S_{SC}^B}.$$

In an implementation, the second determining unit calculates $R_k^B$ according to the formula $$R_k^B = \frac{P_k^{max}}{S_{SC}^B},$$

and correspondingly, the second determining unit may calculate the third threshold according to a formula $$B_{threshold} = \frac{P_{median}}{B_{median}}.$$

In another implementation, the second determining unit calculates $R_k^B$ according to the formula $$R_k^B = \frac{|P_k^{max} - S_{SC}^B|}{S_{SC}^B},$$

and correspondingly, the second determining unit may calculate the third threshold according to a formula $$B_{threshold} = \frac{|P_{median} - B_{median}|}{B_{median}}.$$

$I_{threshold}$ is the first threshold, $I_{median}$ is the median or the average of the sizes of all the I frames in the video, and $B_{median}$ is a median or an average of sizes of all B frames in the video.

Because $P_{median}$ is the median or the average of the sizes of all the P frames in the video, and $B_{median}$ is the median or the average of the sizes of all the B frames in the video, a valid threshold may be accurately calculated using the formula $$B_{threshold} = \frac{P_{median}}{B_{median}} \text{ or } B_{threshold} = \frac{|P_{median} - B_{median}|}{B_{median}}$$

such that a scene change frame in the P frames is accurately detected.

With reference to the third possible implementation of the fourth aspect, in a fourth possible implementation, after $P_{max}$ in the $K^{th}$ GOP is determined as a scene change frame, a median or an average of sizes of P frames other than a P frame that is determined as a scene change frame in the video is used as a new $P_{median}$, and a new $B_{threshold}$ is calculated according to the formula $$B_{threshold} = \frac{P_{median}}{B_{median}} \text{ or } B_{threshold} = \frac{|P_{median} - B_{median}|}{B_{median}}.$$

The new $B_{threshold}$ is used for determining whether $P_{max}$ in a next GOP is a scene change frame.

With reference to the fourth possible implementation of the fourth aspect, the third threshold $B_{threshold}$ may be updated in real time such that impact of a P frame that is determined as a scene change frame is eliminated in a timely manner, thereby further improving accuracy of detecting a scene change frame in the P frames.

According to a fifth aspect, a detection apparatus for detecting a scene change frame in a video is provided, and the detection apparatus includes a processor and a memory.

The memory is configured to store a computer operation instruction.

The processor is configured to execute the computer operation instruction stored in the memory, to enable the detection apparatus to perform the method provided in any one of the first aspect or the possible implementations of the first aspect, or any one of the second aspect or the possible implementations of the second aspect.

In the detection apparatus provided in the fifth aspect of the present disclosure, when a scene change frame in the video is detected, a scene change frame in P frames may be detected such that missed detection of a scene change frame is effectively reduced.

According to a sixth aspect, a detection device is provided, and the detection device includes a media unit and a detection apparatus.

The media unit is configured to obtain a video, and transmit the video to the detection apparatus.

The detection apparatus is configured to obtain the video from the media unit, and perform an operation performed by the detection apparatus provided in any one of the third aspect or the possible implementations of the third aspect, any one of the fourth aspect or the possible implementations of the fourth aspect, or any one of the fifth aspect or the possible implementations of the fifth aspect.

In the detection device provided in the sixth aspect of the present disclosure, when a scene change frame in the video is detected, a scene change frame in P frames may be detected such that missed detection of a scene change frame is effectively reduced.

According to a seventh aspect, a system for implementing video quality evaluation is provided, and the system includes a video server, a transmission device, and a video terminal. A video stream sent by the video server is transmitted to the video terminal through the transmission device.

The transmission device or the video terminal may include the detection apparatus provided in any one of the third aspect or the possible implementations of the third aspect, any one of the fourth aspect or the possible implementations of the fourth aspect, or any one of the fifth aspect or the possible implementations of the fifth aspect.

The system further includes a first detection apparatus, and the first detection apparatus may be the detection apparatus provided in any one of the third aspect or the possible implementations of the third aspect, any one of the fourth aspect or the possible implementations of the fourth aspect, or any one of the fifth aspect or the possible implementations of the fifth aspect. The transmission device or the video terminal is connected to the first detection apparatus, and the first detection apparatus obtains the video stream using the transmission device or the video terminal that is connected to the first detection apparatus.

In the system provided in the seventh aspect of the present disclosure, when a scene change frame in a video is detected, a scene change frame in P frames may be detected such that missed detection of a scene change frame is effectively reduced.

BRIEF DESCRIPTION OF DRAWINGS

To describe the technical solutions in some of the embodiments of the present disclosure more clearly, the following briefly describes the accompanying drawings required for describing some of the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

Figure 1A:
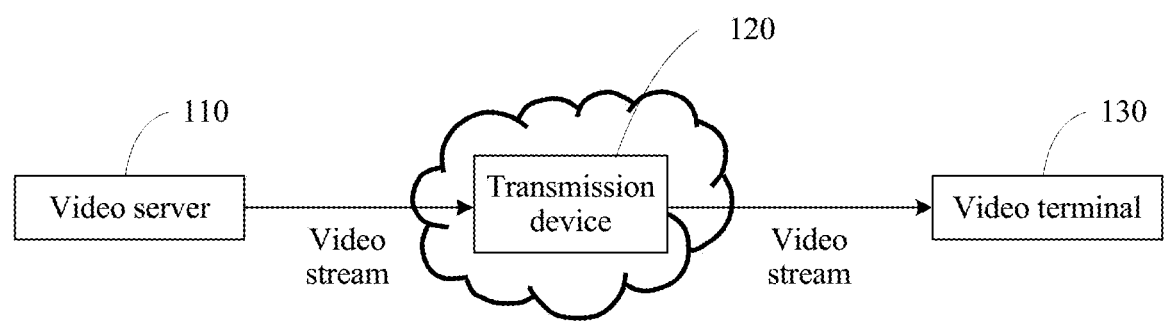
FIG. 1A and FIG. 1B are schematic diagrams of a networking structure of a video system according to Embodiment 1 of the present disclosure.

FIG. 1A is a schematic diagram of a networking structure of a video system according to an embodiment of the present disclosure. The video system includes a video server 110, one or more transmission devices 120, and a video terminal 130. A video stream sent by the video server 110 is transmitted to the video terminal 130 through the transmission device 120.

Figure 1B:
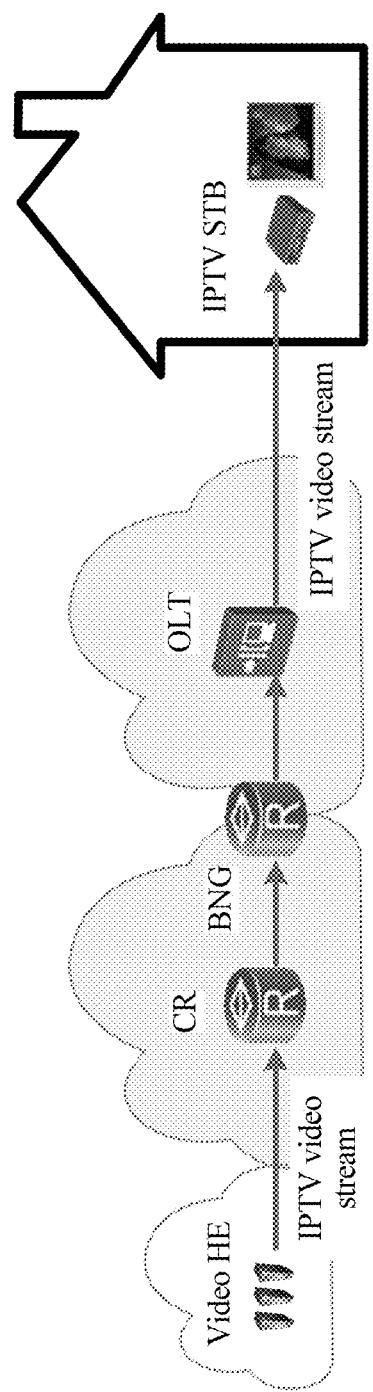

The video system may be an IPTV system shown in FIG. 1B. In the IPTV system, the video server 110 is a video headend (HE). The transmission device 120 includes a network device such as a core router (CR), a broadband network gateway (BNG), or an optical line terminal (OLT). The video terminal 130 is a set top box (STB).

In the video system shown in FIG. 1A and FIG. 1B, when the video stream is transmitted from the video server to the video terminal, an abnormal phenomenon such as a packet loss, a delay, jitter, or disorder may occur in the video stream due to a network status change. These abnormal phenomena may result in problems that erratic display, frame freezing, and the like occur in a video image displayed on a screen of the video terminal, and consequently, video viewing experience of a user is compromised. Therefore, the video viewing experience of the user needs to be monitored by evaluating video quality.

When the video quality is being evaluated, a location at which a scene changes usually needs to be first detected, namely, a location of a scene change frame, and then the video quality is evaluated based on the scene.

For example, because a video coding loss caused during video coding is related to not only a video coding type, a frame rate, a resolution, and a bit rate, but also complexity of the scene, the location at which the scene changes needs to be first detected to evaluate the video coding loss.

For another example, when a packet loss occurs in a video transmission process, a decoder of the video terminal usually uses video content of a corresponding area in a previous frame of a damaged frame as content of a damaged area in the damaged frame to perform error compensation on the damaged frame, and therefore a smaller content difference between the damaged frame and the previous frame produces a better compensation effect. However, when the damaged frame is a scene change frame, because content of the scene change frame is almost completely different from that of the previous frame of the scene change frame, a compensation effect is the worst. Therefore, when video quality is affected by the packet loss, whether the damaged frame is a scene change frame needs to be considered.

Figure 2A:
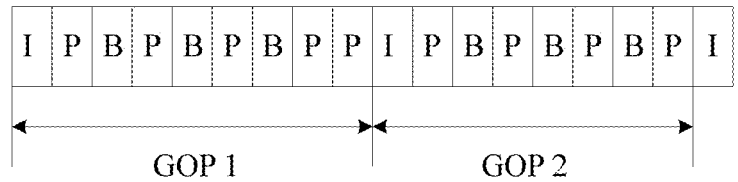
FIG. 2A, FIG. 2B, and FIG. 2C are schematic diagrams of a GOP according to Embodiment 1 of the present disclosure.
Figure 2B:
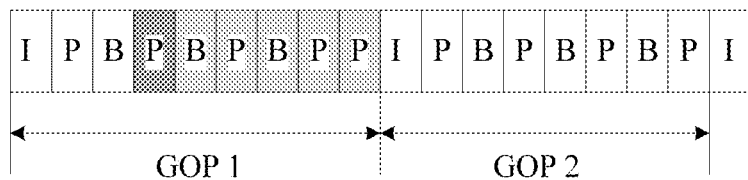
Figure 2C:
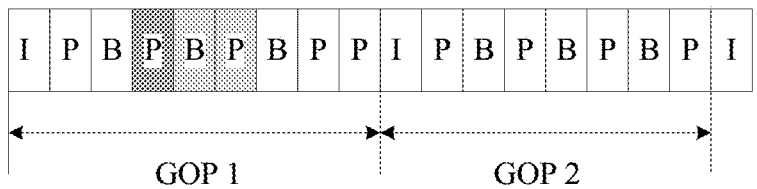

For another example, a coded video frame sequence includes a plurality of GOP. As shown in FIG. 2A, each GOP begins with an I frame followed by some P frames and B frames and ends at a previous frame of a next I frame. The I frame is an intra-frame predictive frame, the P frame is a forward reference frame, and the B frame is a bi-directional reference frame. When a packet loss occurs in a frame in a GOP, a decoding error caused by the packet loss is continuously spread in a next video frame, and usually ends at a last frame in the GOP. As shown in FIG. 2B, when a fourth frame in a GOP 1 is damaged, it is usually considered that an error is continuously spread, and ends at a last frame of the GOP. However, when there is a scene change frame in the GOP, content of the scene change frame is almost completely different from that of a previous frame of the scene change frame, and intra-frame predictive coding is usually performed during coding (intra-frame predictive coding is performed on most macroblocks in the scene change frame). Therefore, if a frame before the scene change frame in the GOP is damaged, error spread ends at the scene change frame. As shown in FIG. 2C, a sixth frame in the GOP 1 is a scene change frame, and when the fourth frame is damaged, error spread ends at the sixth frame. Therefore, when video quality is affected by the packet loss, a scene change frame needs to be detected.

It should be noted that a sequence of frames described in this embodiment of the present disclosure is a sequence of frames in a video in terms of time. For example, a video with duration T (for example, 10 seconds) includes a video frame 1 at a moment t1 and a video frame 2 at a moment t2. If t1 is less than t2, for example, t1 is one second 30 milliseconds, and t2 is five seconds 40 milliseconds, the video frame 1 is before the video frame 2.

In specific implementation, a detection apparatus for detecting a scene change frame may be deployed in the video system. The detection apparatus may be deployed on any device (for example, the transmission device 120 or the video terminal 130) through which the video stream passes, or may be bypassed on any device through which the video stream passes to obtain the video stream in a mirroring manner.

Figure 3A:
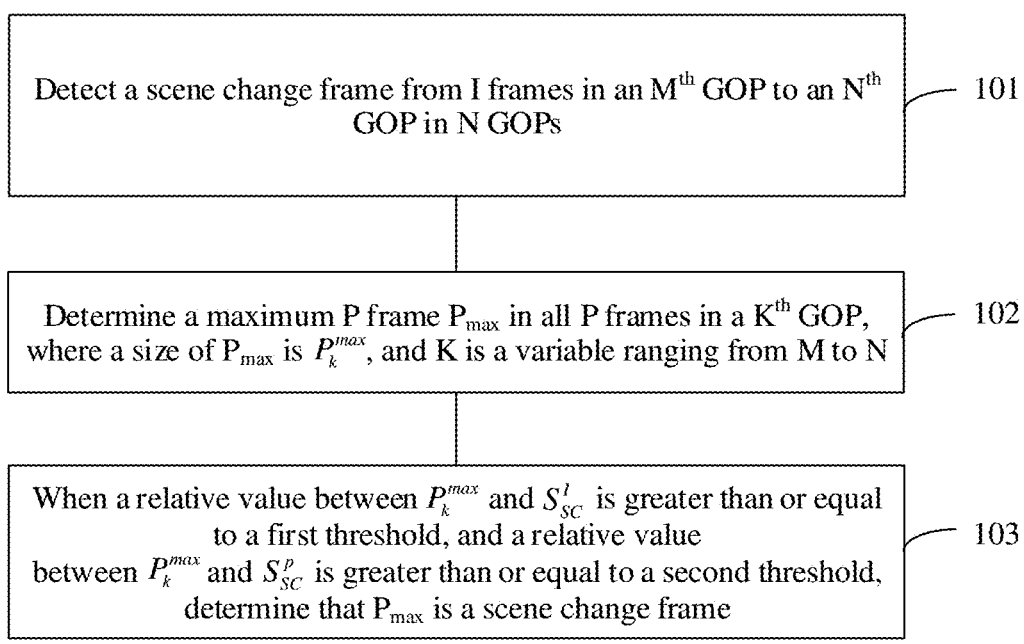
FIG. 3A, FIG. 3B, and FIG. 3C are schematic flowcharts of a method according to an implementation A of Embodiment 1 of the present disclosure.
Figure 3B:
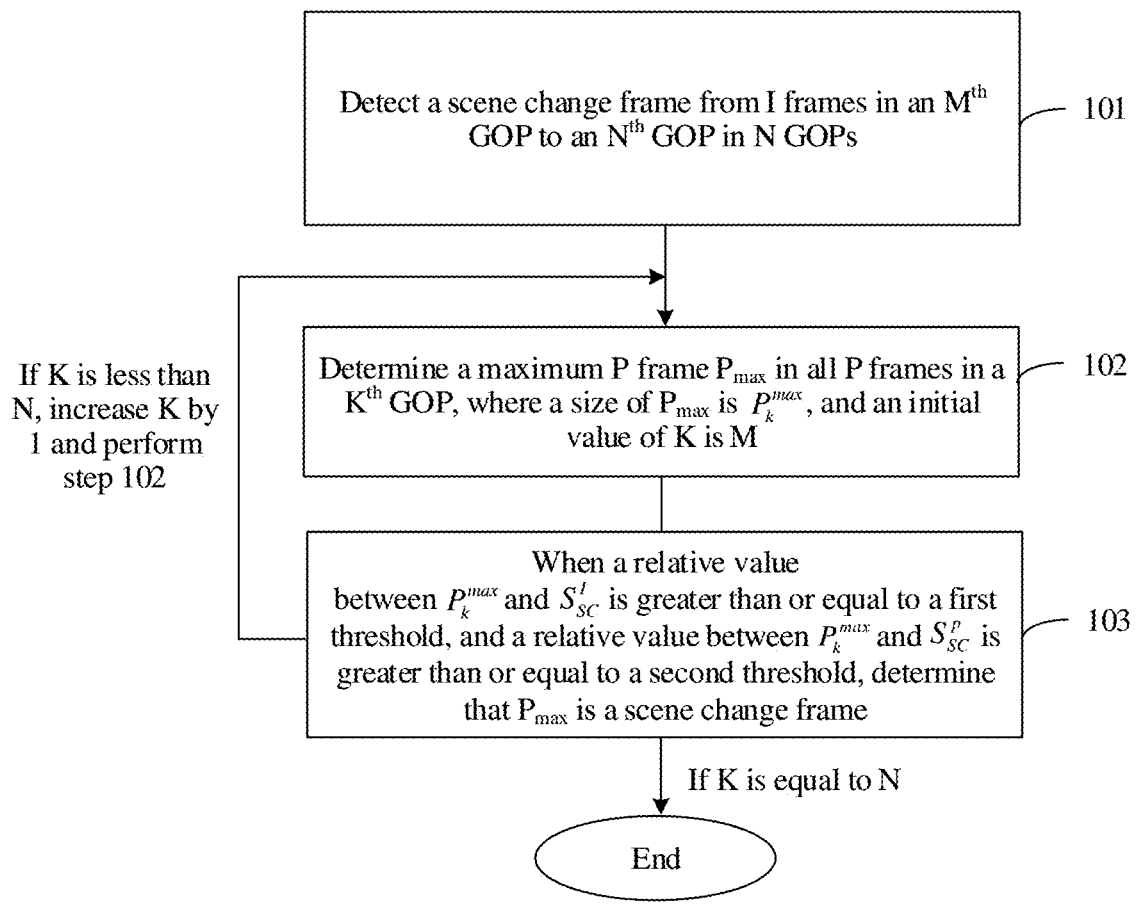

FIG. 3A and FIG. 3B are schematic flowcharts of a method according to Embodiment 1 of the present disclosure. The method in Embodiment 1 of the present disclosure may be applied to the video system shown in FIG. 1A and FIG. 1B, and is performed by a detection apparatus.

In Embodiment 1 of the present disclosure, a scene change frame in a video (referred to as a to-be-detected video below) is detected. The to-be-detected video may be read from a video file, or may be obtained from an obtained video stream. The to-be-detected video may be a complete video, or may be a video segment in a video. For a relatively long video, a measurement time window is usually set, and a video segment in the measurement time window is detected. For example, when a video is being detected, a length of the measurement time window is set to 10 seconds, and a video segment of 0 to 10 seconds in the video is first detected as a to-be-detected video, and then a video segment of 10 to 20 seconds is detected as a to-be-detected video, and such detection is performed by analogy.

Before detection, a detection module may first determine a type (such as an I frame, a P frame, or a B frame) and a size of each video frame in the to-be-detected video.

For example, a video stream is obtained in real time, information about a video frame is extracted from a packet corresponding to a video stream in a measurement time window (for example, 10 to 20 seconds), and a size of the video frame (in a unit of byte) is calculated. A specific process of calculating the size of the video frame is as follows. For each packet in the measurement time window, a start identifier of a current video frame is first found from a header of the packet, and then a load length of the packet including the start identifier and a load length of a subsequent packet are accumulated until a start identifier of a next video frame is found. An accumulated sum is a size of the current video frame. For a specific implementation of calculating the size of the video frame, refer to the standard ITU-T P1201.2.

Then, types of all video frames in the measurement time window are determined. Further, the type of the video frame may be determined based on a field random_access_indicator in a packet header of a packet. For the I frame, regardless of whether the video is encrypted or not, the type of the frame may be determined based on the random_access_indicator. For a non-I frame, when the video is not encrypted, the type of the frame may be directly obtained from a frame header of the video frame. When the video is encrypted or a frame header of the video frame is lost, a GOP mode may be first estimated based on a size of the frame or a presentation time stamp (PTS) of the frame. The GOP mode is usually P B B P B B or P B B B P B B B. The GOP mode can be described using a difference between a value of a current PTS and a value of a previous PTS. Once the GOP mode is determined, modes of all lost or encrypted video frames can be determined. For a specific implementation of determining the type of the video frame, refer to the standard ITU-T P1201.2.

Figure 5A:
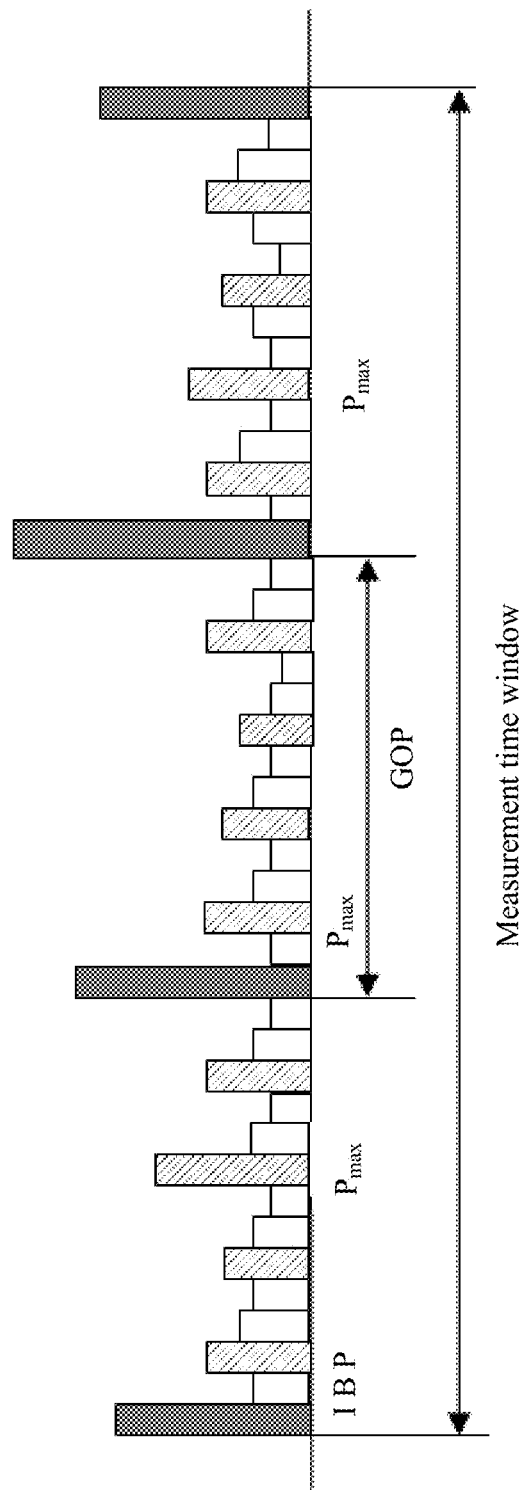
FIG. 5A, FIG. 5B, and FIG. 5C are schematic diagrams of an example of a GOP according to Embodiment 1 of the present disclosure.

The to-be-detected video may be divided into several GOPs by performing the foregoing two steps. One to-be-detected video usually includes a plurality of GOPs. It is assumed that one to-be-detected video includes N GOPs, and N is an integer greater than or equal to 2, as shown in an example in FIG. 5A. In the example shown in FIG. 5A, a solid-color-filled video frame is an I frame, a slash-filled video frame is a P frame, and a video frame with no fill is a B frame.

One video frame is one image. When video frames in the video are being coded, the video frames are coded into different types of frames, for example, an I frame, a P frame, and a B frame. The I frame is an intra-frame predictive frame, only data in the frame is referenced during coding, and therefore the I frame includes complete image data. The P frame is a predictive frame, that is, a unidirectional difference frame, and is used to record a difference between the frame and a previous I frame (or P frame). The B frame is a bi-directional interpolated predictive frame, that is, a bi-directional difference frame, and is used to record a difference between the frame and each of a previous frame and a next frame.

The I frame is usually greater than the P frame, and the P frame is usually greater than the B frame. Generally, the I frame is two to five times the size of the P frame, and the P frame is two to five times the size of the B frame.

Because a difference between content of a scene change frame and that of a previous frame of the scene change frame is relatively large, although the scene change frame is coded into a P frame, intra-frame prediction coding is performed on most macroblocks in the scene change frame with reference to another macroblock in the frame. Therefore, a size of the coded scene change frame is relatively large. If the size of the P frame exceeds half of the size of the I frame, the P frame is likely to be a scene change frame. Therefore, when a scene change frame being the P frame is detected, a relative relationship between the P frame and the I frame may be referenced.

However, when image content in a video changes relatively fast, for example, a shot scene of relatively strenuous exercise such as a strenuous football event, because a correlation between two adjacent video frames is small, when a frame that is not a scene change frame is being coded, although the frame is coded into a P frame with reference to a previous video frame, a compression rate is relatively low, and a size of the P frame is relatively large and even exceeds half of a size of an I frame. In this case, a size difference between adjacent P frames that are not a scene change frame is not large, but a size difference between a P frame that is a scene change frame and a P frame that is adjacent to the P frame and that is not a scene change frame is relatively large. Therefore, when a scene change frame being the P frame is detected, a ratio of sizes of adjacent P frames may also be referenced.

Based on the foregoing analysis, the following describes in detail an implementation A of Embodiment 1 of the present disclosure with reference to FIG. 3A, to detect a scene change frame in a to-be-detected video. The video includes N GOPs, and N is an integer greater than or equal to 2.

The to-be-detected video may be a segment of video in a video file, or may be a segment of video in a video stream, such as a segment of video in a video stream sent by a video server to a video terminal. Correspondingly, the detection apparatus may be disposed on any device (such as the transmission device 120 or the video terminal 130) through which the video stream passes, or may be bypassed on any device through which the video stream passes to obtain the video stream in a mirroring manner.

As shown in FIG. 3A, a method provided in the implementation A of Embodiment 1 of the present disclosure includes the following steps.

The detection apparatus performs the following operation on each GOP starting from an $M^{th}$ GOP in the N GOPs to determine whether a maximum P frame $P_{max}$ in all P frames in each GOP is a scene change frame, where M is greater than or equal to 1 and less than or equal to N.

Further, detection may be first performed on a first GOP, that is, M is equal to 1. Alternatively, detection may be first performed on a GOP following a first GOP. For example, the to-be-detected video is a segment of video at a start of a video stream, and because sizes of frames in the first two GOPs usually have no reference value, the detection is usually first performed on a third GOP, and M is equal to 3.

Step 102: Determine a maximum P frame $P_{max}$ in all P frames in a $K^{th}$ GOP, where a size of $P_{max}$ is $P_k^{max}$, K is a variable ranging from M to N, and $1 \leq M \leq N$.

Step 103: When a relative value between $P_k^{max}$ and $S_{SC}^I$ is greater than or equal to a first threshold, and a relative value between $P_{max}^k$ and $S_{SC}^P$ is greater than or equal to a second threshold, determine that $P_{max}$ is a scene change frame, where $S_{SC}^I$ is a median or an average of sizes of a plurality of I frames between $P_{max}$ and a scene change frame that is closest to $P_{max}$ and that is before $P_{max}$, $S_{SC}^P$ is a median or an average of sizes of a plurality of P frames in the $K^{th}$ GOP, the first threshold is greater than 0 and less than 1, and the second threshold is greater than 1.

In addition, when the relative value between $P_k^{max}$ and $S_{SC}^I$ is less than the first threshold, or the relative value between $P_k^{max}$ and $S_{SC}^P$ is less than the second threshold, it is determined that $P_{max}$ is not a scene change frame.

Figure 5B:
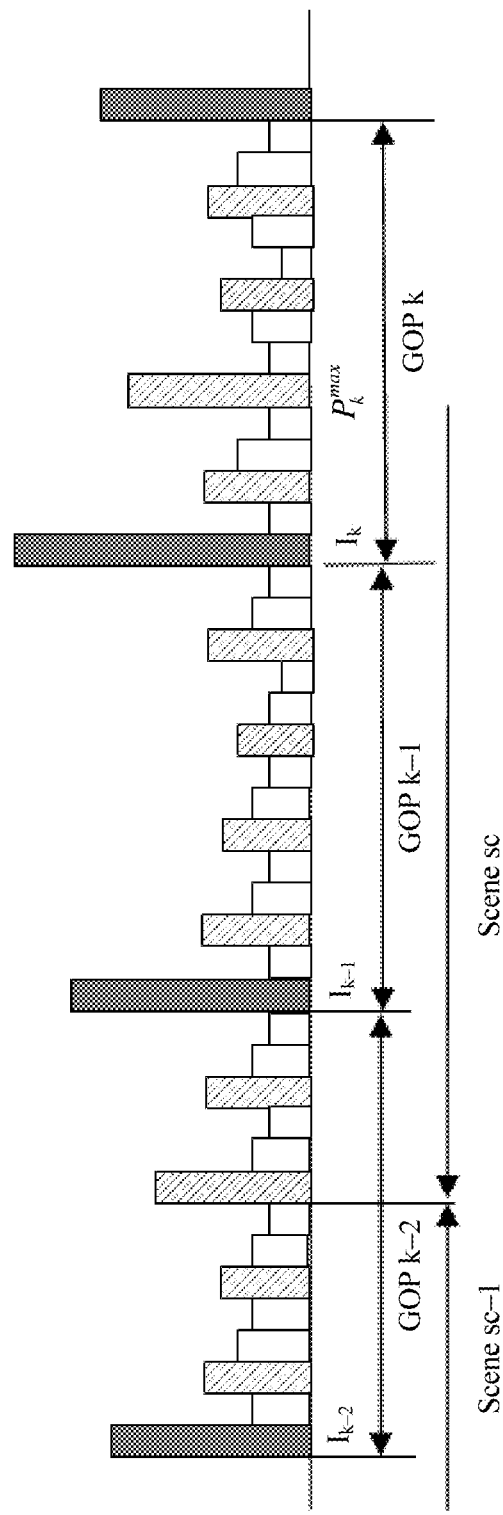

As shown in FIG. 5B, a second P frame in the $K^{th}$ GOP is $P_{max}$, and an I frame in the $K^{th}$ GOP is not a scene change frame, there is no scene change frame in a $(K-1)^{th}$ GOP, and a third P frame in a $(K-2)^{th}$ GOP (referred to as $P'_{max}$ below) is a scene change frame. In this case, a scene change frame that is closest to $P_{max}$ and that is before $P_{max}$ is $P'_{max}$.

In specific implementation, before step 102, an I frame in a first GOP may be determined as a scene change frame. When there is no scene change frame between $P_{max}$ in the $K^{th}$ GOP and the I frame in the first GOP, the scene change frame that is closest to $P_{max}$ and that is before $P_{max}$ is the I frame in the first GOP. If the to-be-detected video is a video segment in a video, and there is a video segment (referred to as a previous video segment below) in which a scene change frame is detected before the to-be-detected video, the scene change frame that is closest to $P_{max}$ and that is before $P_{max}$ may be located in the previous video segment.

$S_{SC}^I$ may be calculated using a median or an average of sizes of all or some I frames between $P_{max}$ and the scene change frame that is closest to $P_{max}$ and that is before $P_{max}$. As shown in FIG. 5B, the second P frame in the $K^{th}$ GOP is $P_{max}$, the scene change frame that is closest to $P_{max}$ and that is before $P_{max}$ is $P'_{max}$, there are two I frames $I_k$ and $I_{k-1}$ between $P_{max}$ and $P'_{max}$, and $s_{sc}^I$ an average of sizes of $I_k$ and $I_{k-1}$.

Figure 5C:
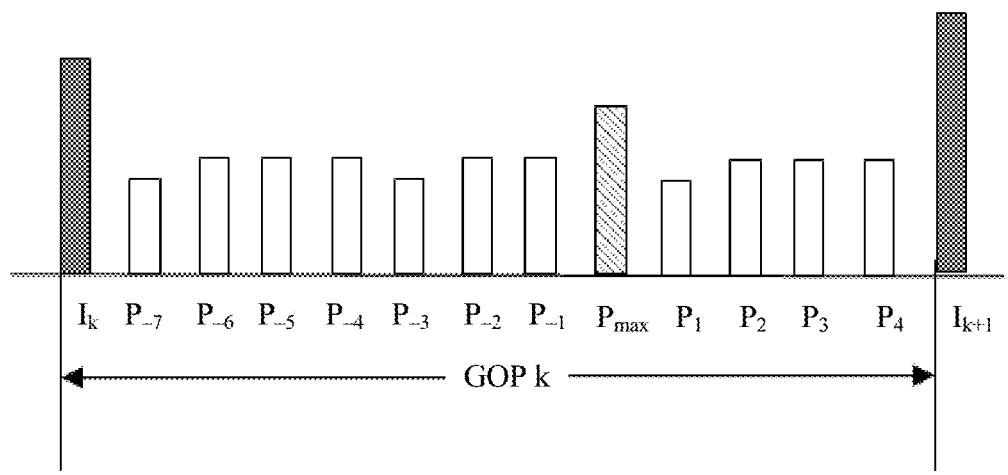

$S_{SC}^P$ may be a median or an average of sizes of all or some P frames in the $K^{th}$ GOP. An implementation is as follows. $S_{SC}^P$ is calculated according to the following formula $S_{SC}^P = F(P_{-m}, \ldots, P_{-1}, P_1, \ldots, P_n)$, where $P_{-m}, \ldots,$ and $P_{-1}$ represent P frames before $P_{max}$ in the $K^{th}$ GOP, $P_1, \ldots,$ and $P_n$ represent P frames after $P_{max}$ in the $K^{th}$ GOP, and F is used to calculate a median or an average of sizes of $P_{-m}, \ldots,$ and $P_{-1}$, and $P_1, \ldots,$ and $P_n$, and $m=\min(\text{num\_before\_P\_frames, max\_num})$, and $n=\min(\text{num\_after\_P\_frames, max\_num})$, where num_before_P_frames is a quantity of P frames before $P_{max}$ in the $K^{th}$ GOP, num_after_P_frames is a quantity of P frames after $P_{max}$ in the $K^{th}$ GOP, and max_num represents a preset quantity of frames that need to be considered. As shown in FIG. 5C, num_before_P_frames is equal to 7, num_after_P_frames is equal to 4, and max_num is set to 6. In this case, m is equal to 6, and n is equal to 4.

$S_{SC}^P$ is calculated using the formula, and some video frames that are closest to $P_{max}$ and that are in a GOP in which $P_{max}$ is located are considered such that accuracy of detecting a scene change frame in the P frames is further improved.

In specific implementation, the relative value $R_k^I$ between $P_k^{max}$ and $S_{SC}^I$ may be calculated according to the following formula:

$$R_k^I = \frac{P_k^{max}}{S_{sc}^I}, \text{ or } R_k^I = \frac{|P_k^{max} - S_{sc}^I|}{S_{sc}^I}.$$

A relative relationship between $P_k^{max}$ and $S_{SC}^P$ may be simply and effectively reflected in a formula $$R_k^P = \frac{P_k^{max}}{S_{SC}^P}.$$

The first threshold may be preset, and a same first threshold may be used in different GOPs in a same to-be-detected video. When $R_k^I$ is calculated according to the formula $$R_k^I = \frac{P_k^{max}}{S_{sc}^I},$$

the first threshold is set to 0.53, or when $R_k^I$ is calculated according to the formula $$R_k^I = \frac{|P_k^{max} - S_{sc}^I|}{S_{sc}^I},$$

the first threshold is set to 0.47.

The first threshold may alternatively be obtained through calculation and may be dynamically adjusted such that detection accuracy is further improved. A process of calculating and dynamically adjusting the first threshold is as follows Before an $M^{th}$ GOP in the to-be-detected video is detected, the first threshold is first calculated according to the following formula:

$$I_{threshold} = \frac{P_{median}}{I_{median}}, \text{ or } I_{threshold} = \frac{|P_{median} - I_{median}|}{I_{median}}.$$

$I_{median}$ is a median or an average of sizes of all I frames in the to-be-detected video, and $P_{median}$ is a median or an average of sizes of all P frames in the to-be-detected video. A median is used as an example. For example, the to-be-detected video includes nine P frames whose sizes are 3, 5, 3, 6, 4, 7, 3, 5, and 4, and a sequence is 3, 3, 3, 4, 4, 5, 5, 6, and 7 in ascending order, and therefore $P_{median}$ is 4, or the to-be-detected video includes three P frames whose sizes are 15, 12, and 18, and a sequence is 12, 15, and 18 in ascending order, and therefore $I_{median}$ is 15.

Because $I_{median}$ is the median or the average of the sizes of all the I frames in the video, and $P_{median}$ is the median or the average of the sizes of all the P frames in the video, a valid threshold may be accurately calculated using the formula $$I_{threshold} = \frac{P_{median}}{I_{median}} \text{ or } I_{threshold} = \frac{|P_{median} - I_{median}|}{I_{median}}$$

such that a scene change frame in the P frames is accurately detected.

Then, each time a new P frame is determined as a scene change frame, for example, it is determined that $P_{max}$ in the $K^{th}$ GOP is a scene change frame, a median or an average of sizes of P frames other than a P frame that is determined as a scene change frame in the to-be-detected video may be used as a new $P_{median}$, a new $I_{threshold}$ is calculated according to the formula $$I_{threshold} = \frac{P_{median}}{I_{median}} \text{ or } I_{threshold} = \frac{|P_{median} - I_{median}|}{I_{median}},$$

and the new $I_{threshold}$ is used for determining whether $P_{max}$ in a next GOP (a GOP following the $K^{th}$ GOP) is a scene change frame.

Because the first threshold $I_{threshold}$ may be updated in real time, impact of a P frame that is determined as a scene change frame is eliminated in a timely manner such that accuracy of detecting a scene change frame in the P frames is further improved.

A specific implementation may be as follows If the first threshold is obtained according to the formula $$I_{threshold} = \frac{P_{median}}{I_{median}},$$

the relative value $R_k^I$ between $P_k^{max}$ and $S_{SC}^I$ is $$R_k^I = \frac{P_k^{max}}{S_{sc}^I},$$

or if the first threshold is obtained according to the formula $$I_{threshold} = \frac{|P_{median} - I_{median}|}{I_{median}},$$

the relative value $R_k^I$ between $P_k^{max}$ and $S_{SC}^I$ is $$R_k^I = \frac{|P_k^{max} - s_{sc}^I|}{s_{sc}^I}.$$

In specific implementation, the relative value $R_k^P$ between $P_k^{max}$ and $S_{SC}^P$ may be calculated according to the following formula:

$$R_k^P = \frac{P_k^{max}}{S_{SC}^P}.$$

A relative relationship between $P_k^{max}$ and $S_{SC}^P$ may be simply and effectively reflected in the formula $$R_k^P = \frac{P_k^{max}}{S_{SC}^P}.$$

The second threshold may be usually preset, and a same second threshold may be used in different GOPs in a same to-be-detected video. For example, the second threshold is set to 1.51.

The implementation A of Embodiment 1 of the present disclosure may further include step 101.

Step 101: Detect a scene change frame from I frames in an $M^{th}$ GOP to an $N^{th}$ GOP in the N GOPs.

In step 101, whether the I frame in the $K^{th}$ GOP is a scene change frame may be further determined based on a ratio of a size of the I frame in the $K^{th}$ GOP to a size of an I frame in a $(K-1)^{th}$ GOP, a ratio of an average of sizes of all P frames in a $(K-1)^{th}$ GOP to an average of sizes of all P frames in the $K^{th}$ GOP, or a ratio of an average of sizes of all B frames in a $(K-1)^{th}$ GOP to an average of sizes of all B frames in the $K^{th}$ GOP. A specific implementation is as follows.

1. Calculate the ratio $r_1$ of the size of the I frame in the $K^{th}$ GOP to the size of the I frame in the $(K-1)^{th}$ GOP.
2. Calculate the ratio $r_p$ of the average of the sizes of all the P frames in the $(K-1)^{th}$ GOP to the average of the sizes of all the P frames in the $K^{th}$ GOP.
3. Calculate the ratio $r_B$ of the average of the sizes of all the B frames in the $(K-1)^{th}$ GOP to the average of the sizes of all the B frames in the $K^{th}$ GOP.
4. If the ratio $r_1$ is greater than a first threshold or is less than a second threshold, further determine the following condition (1) and condition (2), otherwise, determine that the I frame in the $K^{th}$ GOP is not a scene change frame.

Condition (1): $r_p$ is less than a third threshold or $r_p$ is greater than a fourth threshold Condition (2): $r_B$ is less than a fifth threshold or $r_B$ is greater than a sixth threshold If both the condition (1) and the condition (2) are met, it is determined that the I frame in the $K^{th}$ GOP is a scene change frame, otherwise, it is determined that the I frame in the $K^{th}$ GOP is not a scene change frame.

For specific details of the foregoing implementation, refer to the standard ITU-T P1201.2.

In specific implementation, the I frame in the first GOP may be directly determined as a scene change frame. When K is not equal to 1, it can be determined, using the foregoing method, whether the I frame in the $K^{th}$ GOP is a scene change frame.

In specific implementation, as shown in FIG. 3B, the implementation A may be implemented using an implementation J: Step 101 is first performed and then steps 102 and 103 are performed, that is, a scene change frame in the I frames in the $M^{th}$ GOP to the $N^{th}$ GOP is first detected, and then a scene change frame in P frames in the $M^{th}$ GOP to the $N^{th}$ GOP is detected. For example, an I frame in a GOP 1 is first determined as a scene change frame, and then whether an I frame in a GOP M (for example, the GOP 1) to a GOP N is a scene change frame is determined, and whether $P_{max}$ in the GOP M (for example, the GOP 1) to the GOP N is a scene change frame is determined.

Figure 3C:
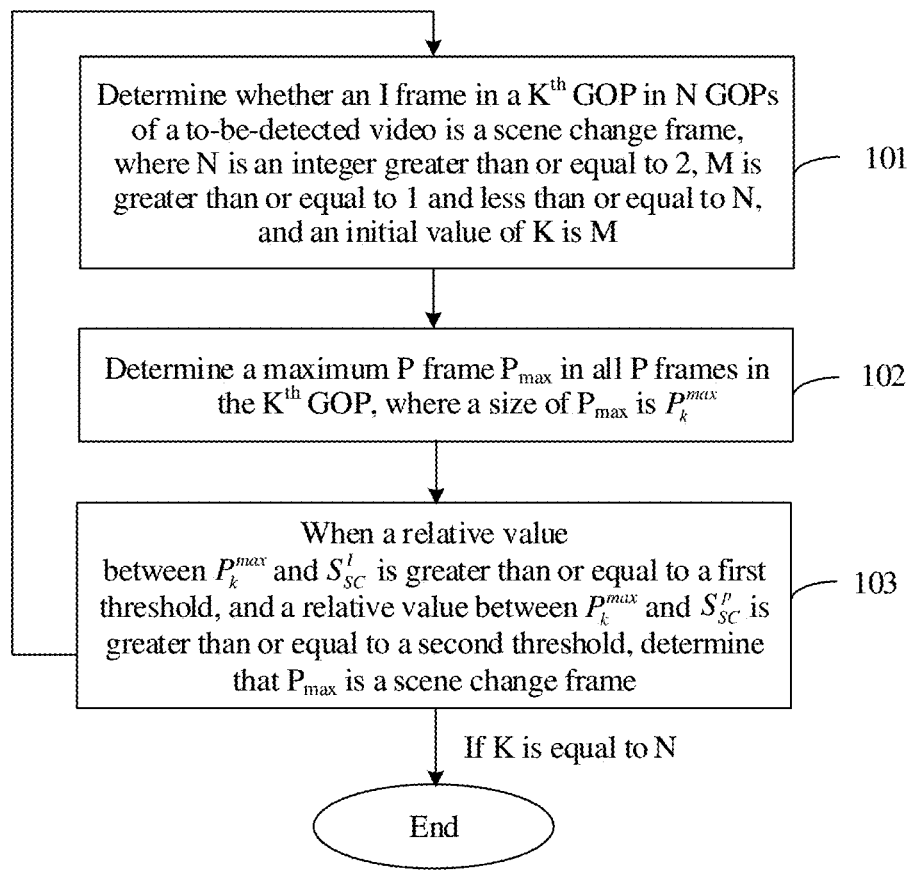

In specific implementation, as shown in FIG. 3C, the implementation A may alternatively be implemented using an implementation K. Step 101 is performed in combination with steps 102 and 103, and a scene change frame is detected based on a sequence of video frames, that is, a scene change frame in a current GOP is detected starting from an $M^{th}$ (for example, a first) GOP based on a sequence of GOPs, and when the scene change frame in the current GOP is detected, whether an I frame in the current GOP is a scene change frame is first detected, and then whether $P_{max}$ in the current GOP is a scene change frame is detected. For example, an I frame in a GOP 1 is first determined as a scene change frame, and then whether $P_{max}$ in the GOP 1, an I frame in a GOP 2, $P_{max}$ in a GOP 2, an I frame in a GOP 3, $P_{max}$ in a GOP 3, . . . , an I frame in a GOP N, or $P_{max}$ in a GOP N is a scene change frame is sequentially determined. In brief, when K is less than N, whether an I frame in a $(K+1)^{th}$ GOP is a scene change frame is determined after whether $P_{max}$ in a $K^{th}$ GOP is a scene change frame is determined.

If the implementation A is implemented using the implementation K, because a probability that a scene continuously changes in a short time is relatively low, a distance (referred to as a first distance below) between an I frame and a previous scene change frame may be first calculated before whether the I frame is a scene change frame is determined. If the first distance is less than or equal to a distance threshold, it is determined that the I frame is not a scene change frame, otherwise, whether the I frame is a scene change frame may be further determined according to a method provided in the standard ITU-T P1201.2. A specific implementation is as follows When K is less than N, and after whether $P_{max}$ in the $K^{th}$ GOP is a scene change frame is determined, if a distance between the I frame (referred to as a current I frame below) in the $(K+1)^{th}$ GOP and a scene change frame that is closest to the current I frame and that is before the current I frame is less than or equal to the distance threshold, it is determined that the current I frame is not a scene change frame, otherwise, whether the current I frame is a scene change frame may be further determined according to a method provided in the standard ITU-T P1201.2.

A distance between two video frames described in the present disclosure is a quantity of video frames between the two video frames. A distance between an $X^{th}$ video frame and a $Y^{th}$ video frame is Y−N, and a distance between two adjacent video frames is 1.

The distance threshold may be preset, and a same distance threshold may be used in different GOPs in a same to-be-detected video.

The distance threshold may alternatively be determined and may be dynamically adjusted such that detection accuracy is further improved. A process of determining and dynamically adjusting the distance threshold is as follows Before a scene change frame in the I frames in the $M^{th}$ GOP to the $N^{th}$ GOP in the N GOPs is detected, an initial distance threshold is first determined, and the determined initial distance threshold may be one of the following three lengths:
 (1) a length of a GOP with a longest length in the N GOPs,
 (2) an average of lengths of the N GOPs, and
 (3) a length L, where a quantity of GOPs with the length L is the largest in the N GOPs.

A length of a GOP described in the present disclosure is a quantity of video frames included in the GOP.

For example, the to-be-detected video includes 8 GOPs whose lengths are 10, 6, 8, 7, 8, 7, 9, and 8, and the initial distance threshold is determined as 10 according to the manner (1), the initial distance threshold is determined as 8 according to the manner (2), and the initial distance threshold is determined as 8 according to the manner (3) because a quantity of GOPs with a length 8 is the largest.

When coding is performed using a fixed GOP length, lengths of all GOPs are the same, and therefore initial distance thresholds calculated in the foregoing three manners are the same.

Then, when a new scene change frame is determined, if a distance (referred to as a second distance below) between the new scene change frame and a scene change frame that is closest to the new scene change frame and that is before the new scene change frame is less than the distance threshold, the distance threshold is updated to the second distance.

In the implementation A of Embodiment 1 of the present disclosure, when a scene change frame in the video is detected, whether a maximum P frame $P_{max}$ in all P frames in a GOP of the video is a scene change frame is determined based on a relative relationship between a size $P_k^{max}$ of $P_{max}$ and a median or an average of sizes of a plurality of I frames between $P_{max}$ and a scene change frame that is closest to $P_{max}$ and that is before $P_{max}$, or a relative relationship between $P_k^{max}$ and a median or an average of sizes of a plurality of P frames in the GOP to detect a scene change frame in the P frames such that missed detection of a scene change frame is effectively reduced.

In addition, in video coding, a P frame is usually greater than a B frame, and the P frame is usually two to five times the size of the B frame. Because a difference between content of a scene change frame and that of a previous frame of the scene change frame is relatively large, although the scene change frame is coded into a P frame, intra-frame prediction coding is performed on most macroblocks in the scene change frame. Therefore, a size of the coded scene change frame is relatively large. If the P frame is less than twice the size of the B frame, the P frame is likely to be a scene change frame. Therefore, when a scene change frame being the P frame is detected, a relative relationship between the P frame and the B frame may be referenced.

Figure 4A:
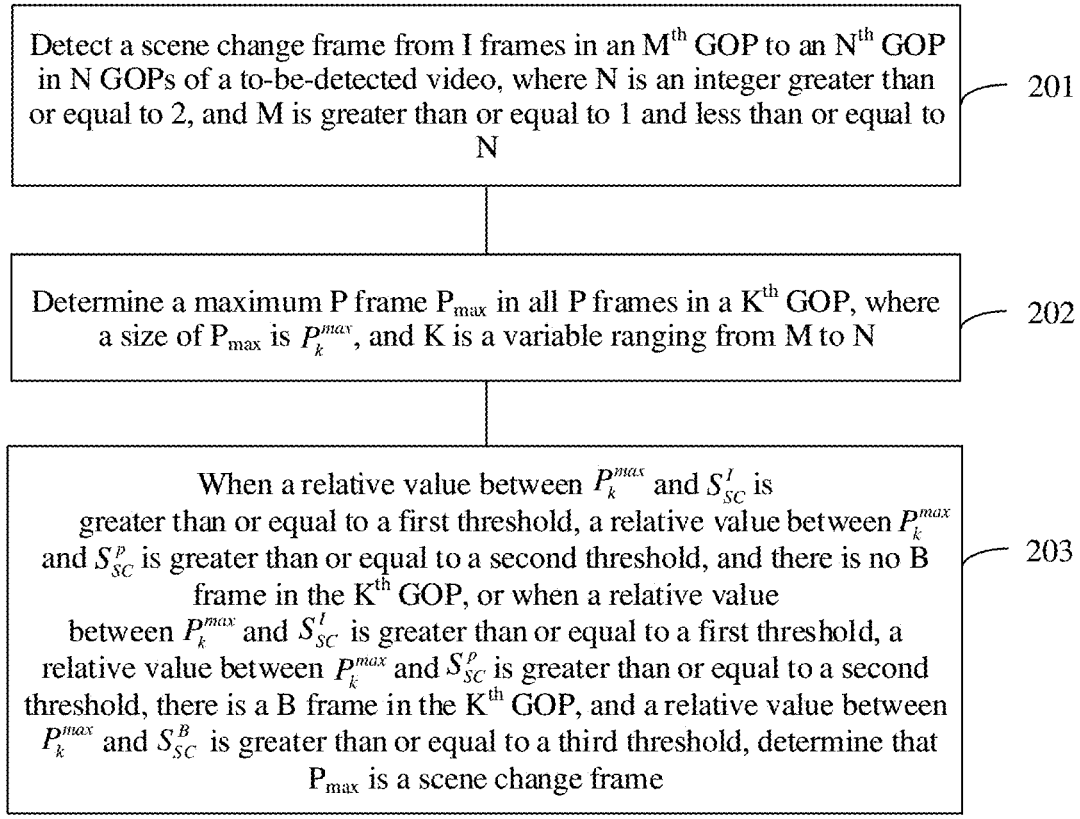
FIG. 4A, FIG. 4B, and FIG. 4C are schematic flowcharts of a method according to an implementation B of Embodiment 1 of the present disclosure.

Based on the foregoing analysis, the following describes in detail an implementation B of Embodiment 1 of the present disclosure with reference to FIG. 4A, to detect a scene change frame in a to-be-detected video. The video includes N GOPs, and N is an integer greater than or equal to 2.

As shown in FIG. 4A, a method provided in the implementation B of Embodiment 1 of the present disclosure includes the following steps.

Step 202: Step 202 is the same as step 102, and details are not described herein again.

Step 203: When a relative value between $P_k^{max}$ and $S_{SC}^P$ is greater than or equal to a first threshold, a relative value between $P_k^{max}$ and $S_{SC}^P$ is greater than or equal to a second threshold, and there is no B frame in the $K^{th}$ GOP, or when a relative value between $P_k^{max}$ and $S_{SC}^I$ is greater than or equal to a first threshold, a relative value between $P_k^{max}$ and $S_{SC}^P$ is greater than or equal to a second threshold, there is a B frame in the $K^{th}$ GOP, and a relative value between $P_k^{max}$ and $S_{SC}^B$ is greater than or equal to a third threshold, determine that $P_{max}$ is a scene change frame, where $S_{SC}^I$ is an average of sizes of a plurality of I frames between $P_{max}$ and a scene change frame that is closest to $P_{max}$ and that is before $P_{max}$, $S_{SC}^P$ is a median or an average of sizes of a plurality of P frames in the $K^{th}$ GOP, $S_{SC}^B$ is a median or an average of sizes of all B frames between $P_{max}$ and the scene change frame that is closest to $P_{max}$ and that is before $P_{max}$, the first threshold is greater than 0 and less than 1, the second threshold is greater than 1, and the third threshold is greater than 1.

In addition, when the relative value between $P_k^{max}$ and $S_{SC}^I$ is less than the first threshold, or the relative value between $P_k^{max}$ and $S_{SC}^P$ is less than the second threshold, or the relative value between $P_k^{max}$ and $S_{SC}^B$ is less than the third threshold, it is determined that $P_{max}$ is not a scene change frame.

A method for determining that the relative value between $P_k^{max}$ and $S_{SC}^I$ is greater than or equal to the first threshold and a method for determining that the relative value between $P_k^{max}$ and $S_{SC}^P$ is greater than or equal to the second threshold are the same as those described in step 102, and details are not described herein again.

In specific implementation, the relative value $R_k^B$ between $P_k^{max}$ and $S_{SC}^B$ may be calculated according to the following formula:

$$R_k^B = \frac{P_k^{max}}{S_{SC}^B}, \text{ or}$$

$$R_k^B = \frac{|P_k^{max} - S_{SC}^B|}{S_{SC}^B}.$$

The relative relationship between $P_k^{max}$ and $S_{SC}^B$ may be simply and effectively reflected in the formula $$R_k^B = \frac{P_k^{max}}{S_{SC}^B} \text{ or}$$

$$R_k^B = \frac{|P_k^{max} - S_{SC}^B|}{S_{SC}^B}.$$

The third threshold may be preset, and a same third threshold may be used in different GOPs in a same to-be-detected video. When $R_k^B$ is calculated according to the formula $$R_k^B = \frac{P_k^{max}}{S_{SC}^B},$$

the third threshold is set to 2.87, or when $R_k^B$ is calculated according to the formula $$R_k^B = \frac{|P_k^{max} - S_{SC}^B|}{S_{SC}^B},$$

the third threshold is set to 1.87.

The third threshold may alternatively be obtained through calculation and may be dynamically adjusted such that detection accuracy is further improved. A process of calculating and dynamically adjusting the third threshold is as follows.

Before an $M^{th}$ GOP in the to-be-detected video is detected, the third threshold is first calculated according to the following formula:

$$B_{threshold} = \frac{P_{median}}{B_{median}}, \text{ or}$$

$$B_{threshold} = \frac{|P_{median} - B_{median}|}{B_{median}}.$$

$B_{threshold}$ is the third threshold, $P_{median}$ is the median or the average of the sizes of all the P frames in the video, and $B_{median}$ is a median or an average of sizes of all B frames in the to-be-detected video.

Because $P_{median}$ is the median or the average of the sizes of all the P frames in the video, and $B_{median}$ is the median or the average of the sizes of all the B frames in the video, a valid threshold may be accurately calculated using the formula $$B_{threshold} = \frac{P_{median}}{B_{median}} \text{ or}$$

$$B_{threshold} = \frac{|P_{median} - B_{median}|}{B_{median}}.$$

such that a scene change frame in the P frames is accurately detected.

Then, each time a new P frame is determined as a scene change frame, if $P_{max}$ in the $K^{th}$ GOP is a scene change frame, a median or an average of sizes of P frames other than a P frame that is determined as a scene change frame in the to-be-detected video may be used as a new $P_{median}$, a new $B_{threshold}$ is calculated according to the formula $$B_{threshold} = \frac{P_{median}}{B_{median}} \text{ or}$$

$$B_{threshold} = \frac{|P_{median} - B_{median}|}{B_{median}},$$

and the new $B_{threshold}$ is used for determining whether $P_{max}$ in a next GOP is a scene change frame.

Because the third threshold $B_{threshold}$ may be updated in real time, impact of a P frame that is determined as a scene change frame is eliminated in a timely manner such that accuracy of detecting a scene change frame in the P frames is further improved.

The implementation B of Embodiment 1 of the present disclosure may further include step 201, step 201 is the same as step 101, and details are not described herein again.

Figure 4B:
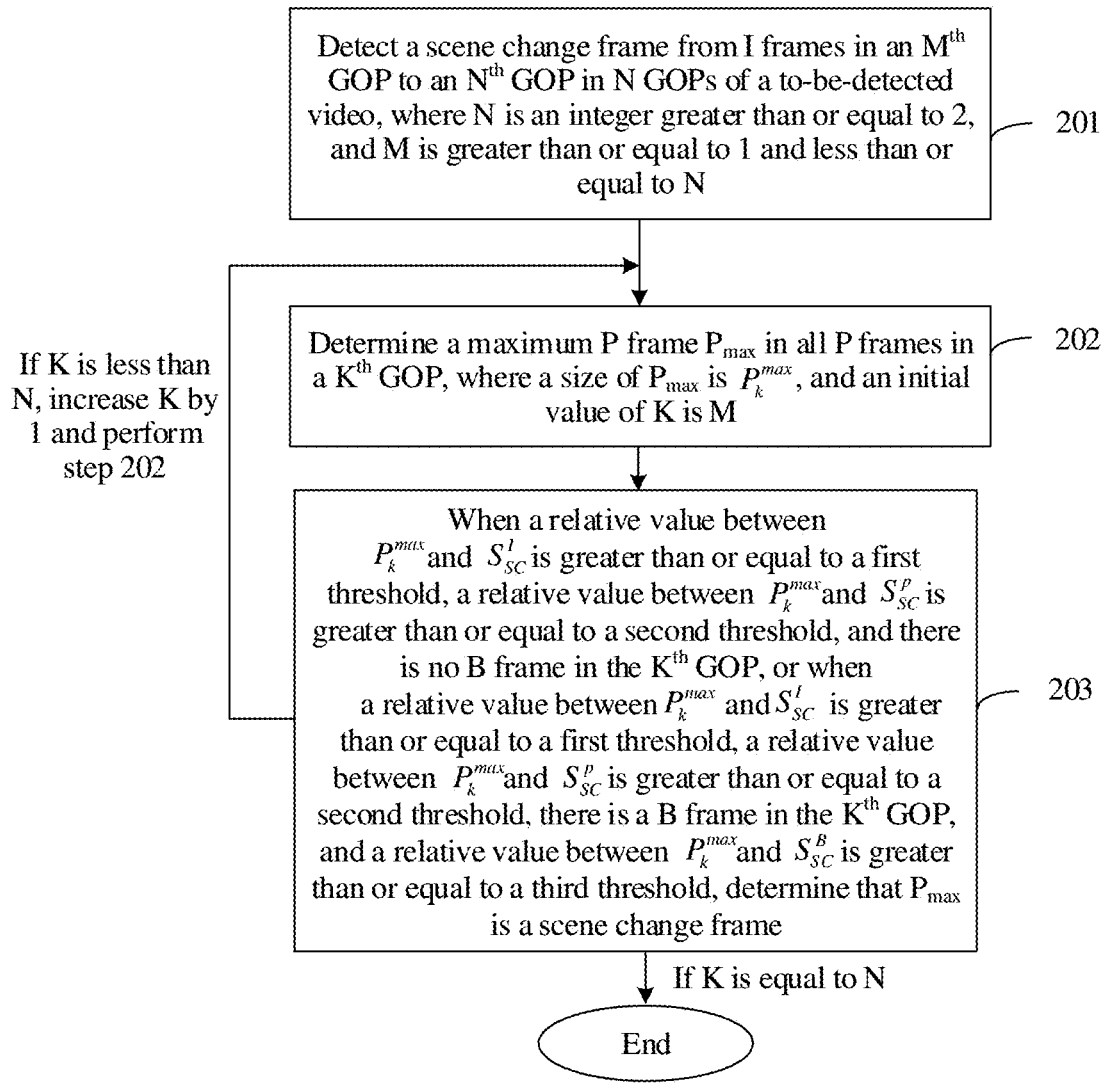
Figure 4C:
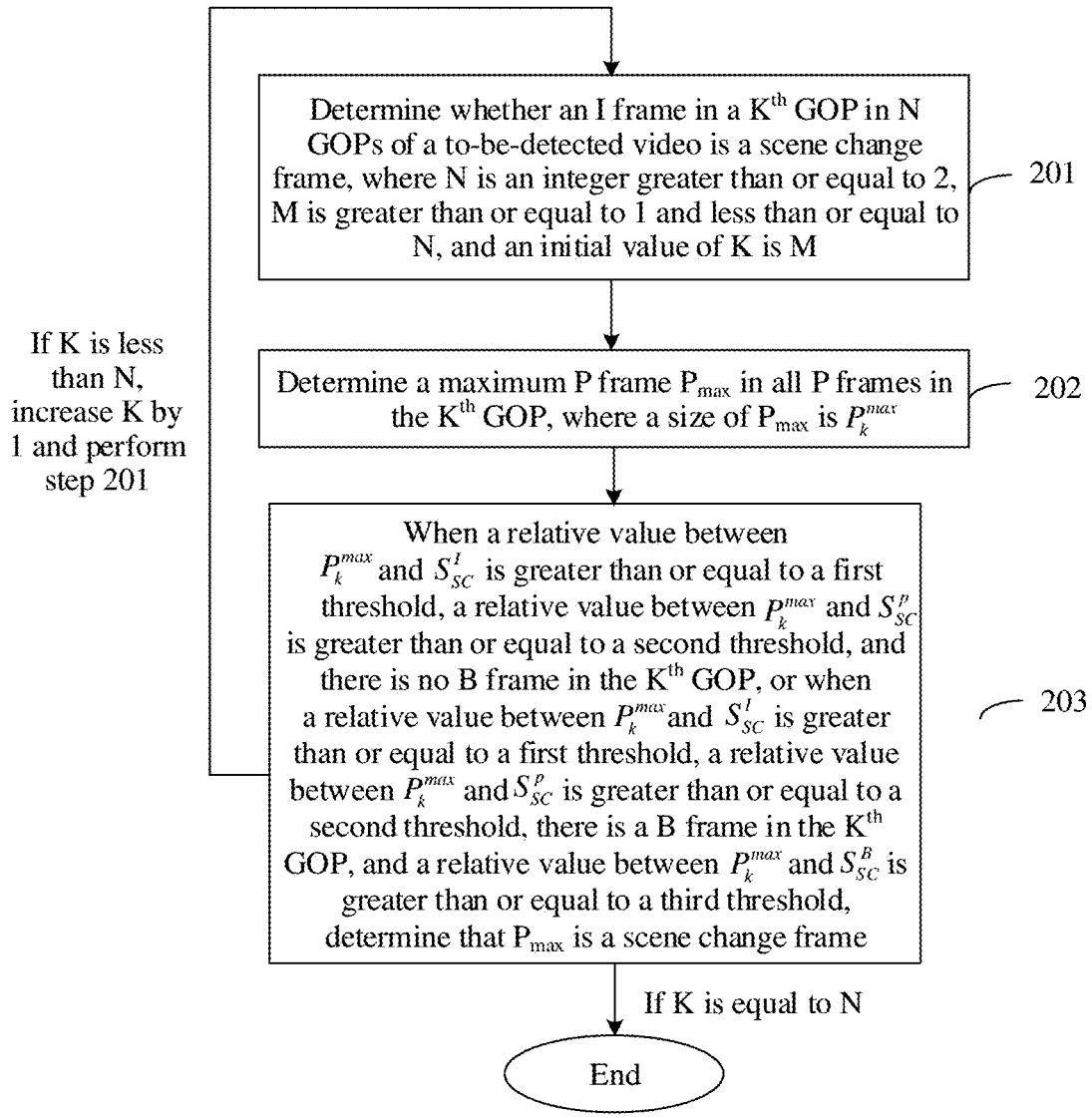

In specific implementation, the implementation B may also be implemented using implementations similar to two implementations (the implementation J and the implementation K) of the implementation A, as shown in FIG. 4B and FIG. 4C.

In the implementation B of Embodiment 1 of the present disclosure, when a scene change frame in the video is detected, whether a maximum P frame $P_{max}$ in all P frames in a GOP of the video is a scene change frame is determined based on a relative relationship between a size $P_k^{max}$ of $P_{max}$ and a median or an average of sizes of a plurality of I frames between $P_{max}$ and a scene change frame that is closest to $P_{max}$ and that is before $P_{max}$, or a relative relationship between $P_k^{max}$ and a median or an average of sizes of a plurality of P frames in the GOP, or a relative relationship between $P_k^{max}$ and a median or an average of sizes of all B frames between $P_{max}$ and a scene change frame that is closest to $P_{max}$ and that is before $P_{max}$ to detect a scene change frame in the P frames such that missed detection of a scene change frame is effectively reduced. In addition, when a scene change frame in the P frames is being detected, not only sizes of an I frame and a P frame but also a size of a B frame is considered such that accuracy of detecting a scene change frame in the P frames is further improved.

Figure 6:
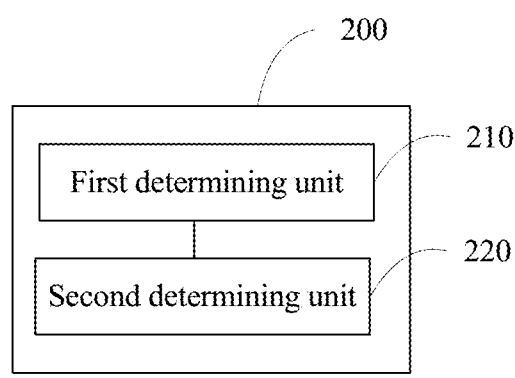
FIG. 6 is a schematic structural diagram of a detection apparatus according to Embodiment 2 of the present disclosure.

Based on Embodiment 1 of the present disclosure, Embodiment 2 of the present disclosure provides a detection apparatus 200 for detecting a scene change frame in a video. The video includes N GOPs, and N is an integer greater than or equal to 2. As shown in FIG. 6, the detection apparatus 200 includes a first determining unit 210 and a second determining unit 220.

A first implementation of Embodiment 2 corresponds to the implementation A of Embodiment 1, and details are as follows.

The first determining unit 210 is configured to determine a maximum P frame $P_{max}$ in all P frames in a $K^{th}$ GOP, where a size of $P_{max}$ is $P_k^{max}$, K is a variable ranging from M to N, and 1≤M≤N.

The second determining unit 220 is configured to, when a relative value between $P_k^{max}$ and $S_{SC}^I$ is greater than or equal to a first threshold, and a relative value between $P_k^{max}$ and $S_{SC}^P$ is greater than or equal to a second threshold, determine that $P_{max}$ is a scene change frame, where $S_{SC}^I$ is a median or an average of sizes of a plurality of I frames between $P_{max}$ and a scene change frame that is closest to $P_{max}$ and that is before $P_{max}$, $S_{SC}^P$ is a median or an average of sizes of a plurality of P frames in the $K^{th}$ GOP, the first threshold is greater than 0 and less than 1, and the second threshold is greater than 1.

Further, the first determining unit 210 may be configured to perform step 102 in the method in the implementation A of Embodiment 1, and the second determining unit 220 may be configured to perform step 103 in the method in the implementation A of Embodiment 1.

Further, the second determining unit 220 may be further configured to detect a scene change frame from I frames in an $M^{th}$ to an $N^{th}$ GOP in the N GOPs, and may be further configured to perform step 101 in the method in the implementation A of Embodiment 1.

A second implementation of Embodiment 2 corresponds to the implementation B of Embodiment 1, and details are as follows.

The first determining unit 210 is configured to determine a maximum P frame $P_{max}$ in all P frames in a $K^{th}$ GOP, where a size of $P_{max}$ is $P_k^{max}$, K is a variable ranging from M to N, and 1≤M≤N.

The second determining unit 220 is configured to, when a relative value between $P_k^{max}$ and $S_{SC}^I$ is greater than or equal to a first threshold, a relative value between $P_k^{max}$ and $S_{SC}^P$ is greater than or equal to a second threshold, and there is no B frame in the $K^{th}$ GOP, or when a relative value between $P_k^{max}$ and $S_{SC}^P$ is greater than or equal to a first threshold, a relative value between $P_k^{max}$ and $S_{SC}^P$ is greater than or equal to a second threshold, there is a B frame in the $K^{th}$ GOP, and a relative value between $P_k^{max}$ and $S_{SC}^B$ is greater than or equal to a third threshold, determine that $P_{max}$ is a scene change frame, where $S_{SC}^I$ is a median or an average of sizes of a plurality of I frames between $P_{max}$ and a scene change frame that is closest to $P_{max}$ and that is before $P_{max}$, $S_{SC}^P$ is a median or an average of sizes of a plurality of P frames in the $K^{th}$ GOP, $S_{SC}^B$ is a median or an average of sizes of all B frames between $P_{max}$ and the scene change frame that is closest to $P_{max}$ and that is before $P_{max}$, the first threshold is greater than 0 and less than 1, the second threshold is greater than 1, and the third threshold is greater than 1.

Further, the first determining unit 210 may be configured to perform step 202 in the method in the implementation B of Embodiment 1, and the second determining unit 220 may be configured to perform step 203 in the method in the implementation B of Embodiment 1.

Further, the second determining unit 220 may be configured to detect a scene change frame from I frames in an $M^{th}$ to an $N^{th}$ GOP in the N GOPs, and may be configured to perform step 201 in the method in the implementation B of Embodiment 1.

In Embodiment 2 of the present disclosure, when a scene change frame in the video is detected, a scene change frame in I frames is detected, and whether a maximum P frame $P_{max}$ in all P frames in a GOP of the video is a scene change frame is determined based on a relative relationship between a size $P_k^{max}$ of $P_{max}$ and a median or an average of sizes of a plurality of I frames between $P_{max}$ and a scene change frame that is closest to $P_{max}$ and that is before $P_{max}$, or a relative relationship between $P_k^{max}$ and a median or an average of sizes of a plurality of P frames in the GOP, to detect a scene change frame in the P frames such that missed detection of a scene change frame is effectively reduced. In the implementation B of Embodiment 2 of the present disclosure, when a scene change frame in the P frames is being detected, not only sizes of an I frame and a P frame but also a size of a B frame is considered such that accuracy of detecting a scene change frame in the P frames is further improved.

Figure 7:
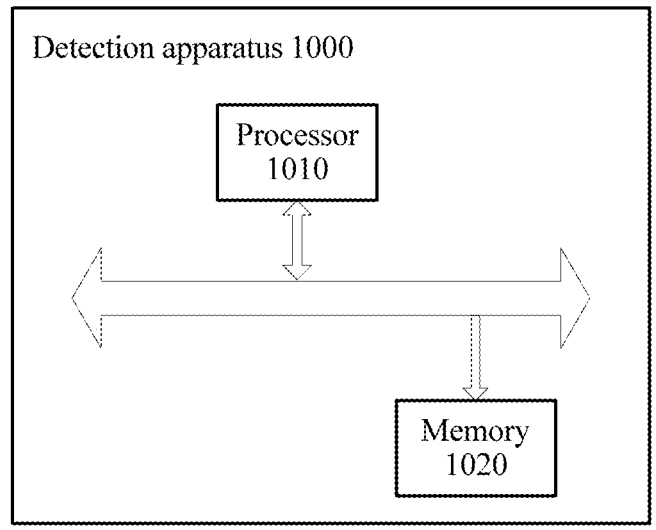
FIG. 7 is a schematic structural diagram of a detection apparatus according to Embodiment 3 of the present disclosure.

According to Embodiment 1 of the present disclosure, Embodiment 3 of the present disclosure provides a detection apparatus 1000. As shown in FIG. 7, the detection apparatus 1000 includes a processor 1010 and a memory 1020, and the processor 1010 and the memory 1020 complete mutual communication using a bus.

The memory 1020 is configured to store a computer operation instruction. The memory 1020 may include a high-speed random access memory (RAM), and may further include a non-volatile memory such as at least one magnetic disk memory.

The processor 1010 is configured to execute the computer operation instruction stored in the memory 1020. The processor 1010 may be a central processing unit (CPU), and is a core unit of a computer.

The processor 1010 executes the computer operation instruction to enable the detection apparatus 1000 to perform the method in the Embodiment 1.

In Embodiment 3 of the present disclosure, when a scene change frame in a video is detected, a scene change frame in P frames may be detected such that missed detection of a scene change frame is effectively reduced.

Figure 8:
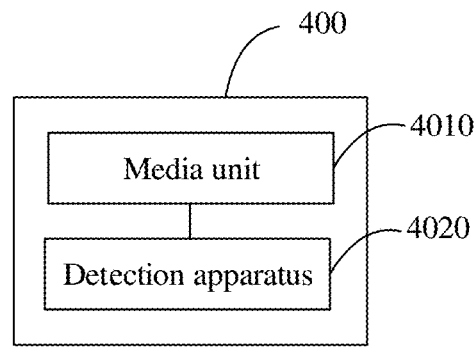
FIG. 8 is a schematic structural diagram of a detection device according to Embodiment 4 of the present disclosure.

According to Embodiments 1 to 3 of the present disclosure, Embodiment 4 of the present disclosure provides a detection device 400. As shown in FIG. 8, the detection device 400 includes a media unit 4010 and a detection apparatus 4020.

The media unit 4010 is configured to obtain the video (referred to as a to-be-detected video below), and transmit the video to the detection apparatus 4020. The media unit 4010 may read the to-be-detected video from a video file, or may obtain the to-be-detected video from a received media stream sent by a video server. The to-be-detected video may be a complete video, or may be a video segment in a video. If the to-be-detected video is a video segment, the media unit 4010 may transmit a video (that is, a video including the video segment) in which the video segment is located to the detection apparatus 4020, and the detection apparatus 4020 detects the video segment in the received video to detect a scene change frame in the to-be-detected video.

The detection apparatus 4020 may be the detection apparatus 200 provided in Embodiment 2 or the detection apparatus 1000 provided in Embodiment 3, and is configured to obtain the to-be-detected video from the media unit 4010, and perform an operation performed by the detection apparatus 200 provided in Embodiment 2 or the detection apparatus 1000 provided in Embodiment 3.

The detection apparatus 4020 may further evaluate, based on the detected scene change frame, quality of the to-be-detected video or quality of the video in which the video segment is located.

In Embodiment 4 of the present disclosure, when a scene change frame in the video is detected, a scene change frame in P frames may be detected such that missed detection of a scene change frame is effectively reduced.

Figure 9A:
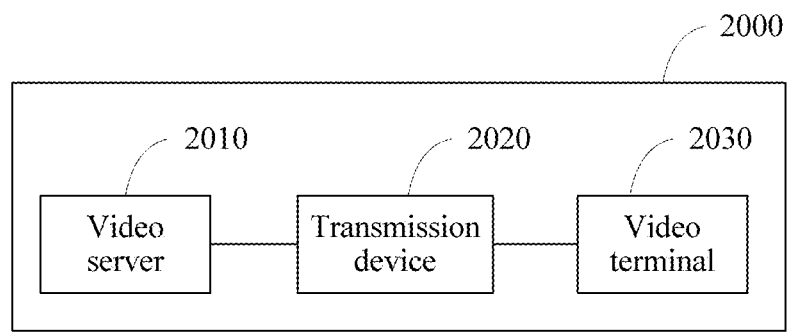
FIG. 9A, FIG. 9B, and FIG. 9C are schematic structural diagrams of a system 2000 according to Embodiment 5 of the present disclosure.

According to Embodiments 1 to 3 of the present disclosure, Embodiment 5 of the present disclosure provides a system 2000 for implementing video quality evaluation. As shown in FIG. 9A, the system 2000 includes a video server 2010, a transmission device 2020, and a video terminal 2030. A video stream sent by the video server 2010 is transmitted to the video terminal 2030 through the transmission device 2020.

In specific implementation, the transmission device 2020 or the video terminal 2030 may include the detection apparatus 200 provided in Embodiment 2 or the detection apparatus 1000 provided in Embodiment 3. In specific implementation, both the transmission device 2020 and the video terminal 2030 may include the detection apparatus 200 provided in Embodiment 2 or the detection apparatus 1000 provided in Embodiment 3. The transmission device 2020 or the video terminal 2030 may be the detection device 400 provided in Embodiment 4.

Figure 9B:
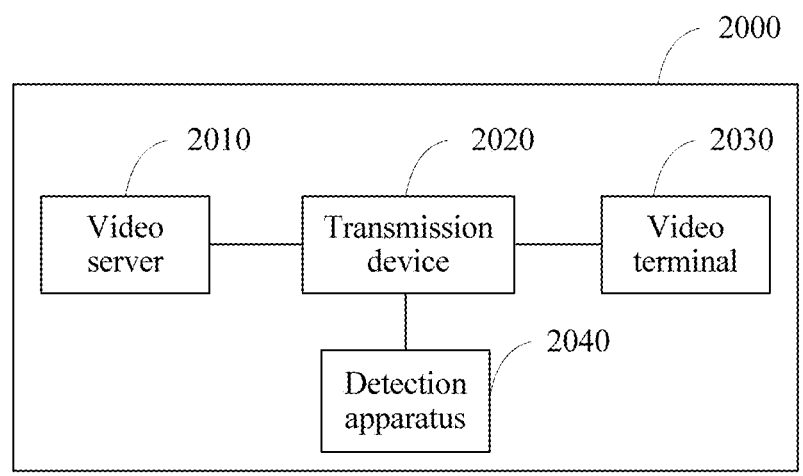
Figure 9C:
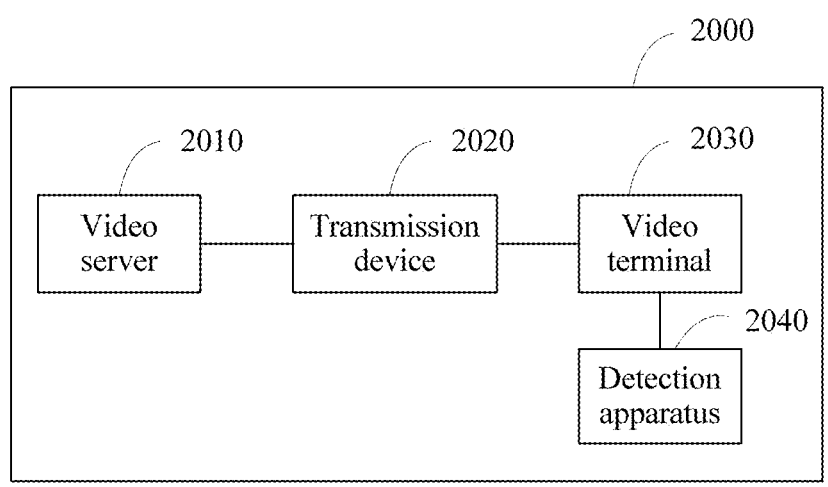

In another specific implementation, the system further includes a detection apparatus 2040. As shown in FIGS. 9B and 9C, the detection apparatus 2040 may be the detection apparatus 200 provided in Embodiment 2 or the detection apparatus 1000 provided in Embodiment 3. The transmission device 2020 or the video terminal 2030 is connected to the detection apparatus 2040, and the detection apparatus 2040 obtains the video stream using the transmission device 2020 or the video terminal 2030 that is connected to the detection apparatus 2040. In specific implementation, the transmission device 2020 and the video terminal 2030 may be separately connected to one detection apparatus 2040.

In Embodiment 5 of the present disclosure, when a scene change frame in a video is detected, a scene change frame in P frames may be detected such that missed detection of a scene change frame is effectively reduced.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the other approaches, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present disclosure. The foregoing storage medium includes any medium that can store program code, such as a universal serial bus (USB) flash drive, a removable hard disk, a read-only memory (ROM), a RAM, a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A detection apparatus for detecting a scene change frame in a video, comprising:
a non-transitory computer readable medium configured to store computer-executable instructions; and
a processor coupled to the non-transitory computer readable medium, wherein the computer-executable instructions cause the processor to be configured to:
determine a maximum P frame ($P_{max}$) in all P frames in a $K^{th}$ group of pictures (GOP), wherein a size of the $P_{max}$ is $P_k^{max}$, wherein K is a variable ranging from M to N, wherein the video comprises N GOPs, wherein the N is an integer greater than or equal to two, and wherein one≤M≤N; and determine that the $P_{max}$ is a first scene change frame when a first value ($R_k^I$) is greater than or equal to a first threshold and a second value ($R_k^P$) is greater than or equal to a second threshold, wherein the $R_k^I$ is calculated according to a formula $$R_k^I = \frac{P_k^{max}}{s_{sc}^I}$$

or $$R_k^I = \frac{|P_k^{max} - s_{sc}^I|}{s_{sc}^I},$$

wherein the $R_k^P$ is calculated according to a formula $$R_k^P = \frac{P_k^{max}}{S_{SC}^P},$$

wherein the $S_{SC}^I$ is a median or an average of sizes of a plurality of I frames between the $P_{max}$ and a scene change frame proximate to the $P_{max}$ and before the $P_{max}$, wherein the $S_{SC}^P$ is a median or an average of sizes of a plurality of P frames in the $K^{th}$ GOP, wherein the first threshold is greater than zero and less than one, and wherein the second threshold is greater than one.

2. The detection apparatus of claim 1, wherein the computer-executable instructions further cause the processor to be configured to calculate the first threshold according to a formula $$I_{threshold} = \frac{P_{median}}{I_{median}}$$

when the $$R_k^I = \frac{P_k^{max}}{s_{sc}^I},$$

wherein the $I_{threshold}$ is the first threshold, wherein the $I_{median}$ is a median or an average of sizes of all I frames in the video, and wherein the $P_{median}$ is a median or an average of sizes of all P frames in the video.

3. The detection apparatus of claim 2, wherein after the $P_{max}$ in the $K^{th}$ GOP is determined as the first scene change frame, the computer-executable instructions further cause the processor to be configured to:

set, as a new $P_{median}$, a median or an average of sizes of P frames other than a P frame determined as a scene change frame in the video; and calculate a new $I_{threshold}$ according to the formula $$I_{threshold} = \frac{P_{median}}{I_{median}},$$

wherein the new $I_{threshold}$ is used for determining whether a $P_{max}$ in a next GOP is a third scene change frame.

4. The detection apparatus of claim 1, wherein the computer-executable instructions further cause the processor to be configured to calculate the first threshold according to a formula $$I_{threshold} = \frac{|P_{median} - I_{median}|}{I_{median}}$$

when the $$R_k^I = \frac{|P_k^{max} - s_{sc}^I|}{s_{sc}^I},$$

wherein the $I_{threshold}$ is the first threshold, wherein the $I_{median}$ is a median or an average of sizes of all I frames in the video, and wherein the $P_{median}$ is a median or an average of sizes of all P frames in the video.

5. The detection apparatus of claim 1, wherein the computer-executable instructions further cause the processor to be configured to:

detect a scene change frame from I frames in an $M^{th}$ GOP to an $N^{th}$ GOP in the N GOPs; and when K is less than N, after it is determined whether $P_{max}$ in the $K^{th}$ GOP is a scene change frame, determining whether an I frame in a $(K+1)^{th}$ GOP is a scene change frame, wherein the detecting a scene change frame from I frames in an $M^{th}$ GOP to an $N^{th}$ GOP in the N GOPs specifically comprises when it is determined that a first distance is less than or equal to a distance threshold, determining that the I frame in the $(K+1)^{th}$ GOP is not a scene change frame, wherein the first distance is a distance between the I frame in the $(K+1)^{th}$ GOP and a scene change frame that is closest to the I frame in the $(K+1)^{th}$ GOP and that is before the I frame in the $(K+1)^{th}$ GOP.

6. The detection apparatus of claim 5, wherein the computer-executable instructions further cause the processor to be configured to set the distance threshold, and wherein the distance threshold comprises at least one of:

a length of a GOP with a longest length in the N GOPs;
a median or an average of lengths of the N GOPs; or
a length L, wherein a quantity of GOPs with the length L is the largest in the N GOPs.

7. The detection apparatus of claim 5, wherein the computer-executable instructions further cause the processor to be configured to:

determine a new scene change frame; and
update the distance threshold to a second distance when the second distance is less than the distance threshold, wherein the second distance is a distance between the new scene change frame and a scene change frame proximate to the new scene change frame and before the new scene change frame.

8. A detection apparatus for detecting a scene change frame in a video, comprising:

a non-transitory computer readable medium configured to store computer-executable instructions; and a processor coupled to the non-transitory computer readable medium, wherein the computer-executable instructions cause the processor to be configured to:

determine a maximum P frame ($P_{max}$) in all P frames in a $K^{th}$ group of pictures (GOP), wherein a size of the $P_{max}$ is $P_k^{max}$, wherein K is a variable ranging from M to N, wherein the video comprises N GOPs, wherein the N is an integer greater than or equal to two, and wherein one≤M≤N; and determine that the $P_{max}$ is a first scene change frame when a first value ($R_k^I$) is greater than or equal to a first threshold, a second value ($R_k^P$) is greater than or equal to a second threshold, a B frame is comprised in the $K^{th}$ GOP, and a third value is greater than or equal to a third threshold, wherein the $R_k^I$ is calculated according to a formula $$R_k^I = \frac{P_k^{max}}{S_{sc}^I}$$

or $$R_k^I = \frac{|P_k^{max} - s_{sc}^I|}{s_{sc}^I},$$

wherein the $R_k^P$ is calculated according to a formula $$R_k^P = \frac{P_k^{max}}{S_{SC}^P},$$

wherein the $S_{SC}^I$ is a median or an average of sizes of a plurality of I frames between the $P_{max}$ and a scene change frame proximate to the $P_{max}$ and before the $P_{max}$, wherein the $S_{SC}^P$ is a median or an average of sizes of a plurality of P frames in the $K^{th}$ GOP, wherein the $S_{SC}^B$ is a median or an average of sizes of all B frames between the $P_{max}$ and the scene change frame proximate to the $P_{max}$ and before the $P_{max}$, wherein the first threshold is greater than zero and less than one, wherein the second threshold is greater than one, and wherein the third threshold is greater than one.

9. The detection apparatus of claim 8, wherein the computer-executable instructions further cause the processor to be configured to:
calculate the first threshold according to a formula $$I_{threshold} = \frac{P_{median}}{I_{median}}$$

when the $$R_k^I = \frac{P_k^{max}}{s_{sc}^I};$$

or
calculate the first threshold according to a formula $$I_{threshold} = \frac{|P_{median} - I_{median}|}{I_{median}}$$

when the $$R_k^I = \frac{|P_k^{max} - s_{sc}^I|}{s_{sc}^I},$$

wherein the $I_{threshold}$ is the first threshold, wherein the $I_{median}$ is a median or an average of sizes of all I frames in the video, and wherein the $P_{median}$ is a median or an average of sizes of all P frames in the video.

10. The detection apparatus of claim 9, wherein after the $P_{max}$ in the $K^{th}$ GOP is determined as the first scene change frame, the computer-executable instructions further cause the processor to be configured to:
set, as a new $P_{median}$, a median or an average of sizes of P frames other than a P frame determined as a scene change frame in the video; and
calculate a new $I_{threshold}$ according to the formula $$I_{threshold} = \frac{P_{median}}{I_{median}}$$

or the formula $$I_{threshold} = \frac{|P_{median} - I_{median}|}{I_{median}},$$

wherein the new $I_{threshold}$ is used for determining whether a $P_{max}$ in a next GOP is a scene change frame.

11. The detection apparatus of claim 8, wherein the computer-executable instructions further cause the processor to be configured to:
calculate the third threshold according to a formula $$B_{threshold} = \frac{P_{median}}{B_{median}};$$

or
calculate the third threshold according to a formula $$B_{threshold} = \frac{|P_{median} - B_{median}|}{B_{median}},$$

wherein the $B_{threshold}$ is the third threshold, wherein the $P_{median}$ is a median or an average of sizes of all P frames in the video, and wherein the $B_{median}$ is a median or an average of sizes of all B frames in the video.

12. The detection apparatus of claim 8, wherein the computer-executable instructions further cause the processor to be configured to:
detect a second scene change frame from I frames in an $M^{th}$ GOP to an $N^{th}$ GOP in the N GOPs; and
determine whether an I frame in a $(K+1)^{th}$ GOP is a third scene change frame when the K is less than the N and after it is determined whether the $P_{max}$ in the $K^{th}$ GOP is the first scene change frame, and
wherein in a manner of detecting the second scene change frame from the I frames in the $M^{th}$ GOP to the $N^{th}$ GOP in the N GOPs, the computer-executable instructions further cause the processor to be configured to determine that the I frame in the $(K+1)^{th}$ GOP is not the third scene change frame when a first distance is less than or equal to a distance threshold, wherein the first distance is a distance between the I frame in the $(K+1)^{th}$ GOP and a scene change frame proximate to the I frame in the $(K+1)^{th}$ GOP and before the I frame in the $(K+1)^{th}$ GOP.

13. The detection apparatus of claim 12, wherein the computer-executable instructions further cause the processor to be configured to set the distance threshold, and wherein the distance threshold is one of:
  a length of a GOP with a longest length in the N GOPs;
  a median or an average of lengths of the N GOPs; or
  a length L, wherein a quantity of GOPs with the length L is the largest in the N GOPs.

14. The detection apparatus of claim 13, wherein the computer-executable instructions further cause the processor to be configured to:
  determine a new scene change frame; and
  update the distance threshold to a second distance when the second distance is less than the distance threshold, wherein the second distance is a distance between the new scene change frame and a scene change frame proximate to the new scene change frame and before the new scene change frame.

15. A method for detecting a scene change frame in a video, comprising:
  determining a maximum P frame ($P_{max}$) in all P frames in a $K^{th}$ group of pictures (GOP), wherein a size of the $P_{max}$ is $P_k^{max}$, wherein K is a variable ranging from M to N, wherein the video comprises N GOPs, wherein the N is an integer greater than or equal to two, and wherein one≤M≤N;
  determining that the $P_{max}$ is a first scene change frame when a first value ($R_k^I$) is greater than or equal to a first threshold and a second value ($R_k^P$) is greater than or equal to a second threshold, wherein determining the first scene change frame increases accuracy of detecting scene change frames in all the P frames, wherein the $R_k^I$ is calculated according to a formula $$R_k^I = \frac{P_k^{max}}{s_{sc}^I}$$

or $$R_k^I = \frac{|P_k^{max} - s_{sc}^I|}{s_{sc}^I},$$

wherein the $R_k^P$ is calculated according to a formula $$R_k^P = \frac{P_k^{max}}{S_{SC}^P},$$

wherein the $S_{SC}^I$ is a median or an average of sizes of a plurality of I frames between the $P_{max}$ and a scene change frame proximate to the $P_{max}$ and before the $P_{max}$, wherein the $S_{SC}^P$ is a median or an average of sizes of a plurality of P frames in the $K^{th}$ GOP, wherein the first threshold is greater than zero and less than one, and wherein the second threshold is greater than one; and
  evaluating, based on the first scene change frame, quality of the video.

16. The method of claim 15, further comprising:
  calculating the first threshold according to a formula $$I_{threshold} = \frac{P_{median}}{I_{median}}$$

when the $$R_k^I = \frac{P_k^{max}}{s_{sc}^I};$$

and
  calculating the first threshold according to a formula $$I_{threshold} = \frac{|P_{median} - I_{median}|}{I_{median}}$$

when the $$R_k^I = \frac{|P_k^{max} - s_{sc}^I|}{s_{sc}^I},$$

wherein the $I_{threshold}$ is the first threshold, wherein the $I_{median}$ is a median or an average of sizes of all I frames in the video, and wherein the $P_{median}$ is a median or an average of sizes of all P frames in the video.

17. The method of claim 15, further comprising:
  detecting a second scene change frame from I frames in an $M^{th}$ GOP to an $N^{th}$ GOP in the N GOPs; and
  determining whether an I frame in a $(K+1)^{th}$ GOP is a third scene change frame when the K is less than the N and after it is determined whether the $P_{max}$ in the $K^{th}$ GOP is the first scene change frame, and
  wherein detecting the second scene change frame from the I frames in the $M^{th}$ GOP to the $N^{th}$ GOP in the N GOPs comprises determining that the I frame in the $(K+1)^{th}$ GOP is not the third scene change frame when a first distance is less than or equal to a distance threshold, wherein the first distance is a distance between the I frame in the $(K+1)^{th}$ GOP and a scene change frame proximate to the I frame in the $(K+1)^{th}$ GOP and before the I frame in the $(K+1)^{th}$ GOP.

18. The method of claim 17, further comprising setting the distance threshold, and wherein the distance threshold is one of:
  a length of a GOP with a longest length in the N GOPs;
  a median or an average of lengths of the N GOPs; or
  a length L, wherein a quantity of GOPs with the length L is the largest in the N GOPs.

19. A method for detecting a scene change frame in a video, comprising:
  determining a maximum P frame ($P_{max}$) in all P frames in a $K^{th}$ GOP, wherein a size of the $P_{max}$ is $P_k^{max}$, wherein K is a variable ranging from M to N, wherein the video comprises N groups of pictures (GOPs), wherein the N is an integer greater than or equal to two, and wherein one≤M≤N;
  determining that the $P_{max}$ is a first scene change frame when a first value ($R_k^I$) is greater than or equal to a first threshold, a second value ($R_k^P$) is greater than or equal to a second threshold, a B frame is comprised in the $K^{th}$ GOP, and a third value is greater than or equal to a third threshold, wherein determining the first scene change frame increases accuracy of detecting scene change frames in all the P frames, wherein the $R_k^I$ is calculated according to a formula $$R_k^I = \frac{P_k^{max}}{s_{sc}^I}$$

or $$R_k^I = \frac{|P_k^{max} - s_{sc}^I|}{s_{sc}^I},$$

wherein the $R_k^P$ is calculated according to a formula $$R_k^P = \frac{P_k^{max}}{S_{SC}^P},$$

wherein the $S_{SC}^I$ is a median or an average of sizes of a plurality of I frames between the $P_{max}$ and a scene change frame proximate to the $P_{max}$ and before the $P_{max}$, wherein the $S_{SC}^P$ is a median or an average of sizes of a plurality of P frames in the $K^{th}$ GOP, and wherein the $S_{SC}^B$ is a median or an average of sizes of all B frames between the $P_{max}$ and the scene change frame proximate to the $P_{max}$ and before the $P_{max}$, wherein the first threshold is greater than zero and less than one, wherein the second threshold is greater than one, and wherein the third threshold is greater than one; and evaluating, based on the first scene change frame, quality of the video.

20. The method according to claim 19, further comprising:

calculating the first threshold according to a formula $$I_{threshold} = \frac{P_{median}}{I_{median}}$$

when the $$R_k^I = \frac{P_k^{max}}{s_{sc}^I};$$

and calculating the first threshold according to a formula $$I_{threshold} = \frac{|P_{median} - I_{median}|}{I_{median}}$$

when the $$R_k^I = \frac{|P_k^{max} - s_{sc}^I|}{s_{sc}^I},$$

wherein the $I_{threshold}$ is the first threshold, wherein the $I_{median}$ is a median or an average of sizes of all I frames in the video, and wherein the $P_{median}$ is a median or an average of sizes of all P frames in the video.

* * * * *